(12) United States Patent
Yang et al.

(10) Patent No.: US 9,116,601 B2
(45) Date of Patent: Aug. 25, 2015

(54) METHOD AND APPARATUS FOR PROVIDING A USER INTERFACE

(75) Inventors: Pil-eun Yang, Seoul (KR); Young-jae Ryu, Yongin-si (KR); Yoo-ra Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 358 days.

(21) Appl. No.: 13/026,831

(22) Filed: Feb. 14, 2011

(65) Prior Publication Data

US 2011/0202868 A1    Aug. 18, 2011

(30) Foreign Application Priority Data

Feb. 12, 2010   (KR) .................. 10-2010-0013602
Feb. 18, 2010   (KR) .................. 10-2010-0014744
Jul. 9, 2010    (KR) .................. 10-2010-0066417

(51) Int. Cl.
| | | |
|---|---|---|
| G06F 3/048 | (2013.01) | |
| G06F 3/0482 | (2013.01) | |
| G06F 3/0481 | (2013.01) | |
| G06F 3/14 | (2006.01) | |
| G09G 5/14 | (2006.01) | |

(52) U.S. Cl.
CPC ............ *G06F 3/0482* (2013.01); *G06F 3/0481* (2013.01); *G06F 3/1423* (2013.01); *G09G 5/14* (2013.01); *G09G 2370/027* (2013.01)

(58) Field of Classification Search
CPC  G06F 3/0482; G06F 3/0481; G06F 17/30769

USPC ......... 715/733, 744, 748, 769, 810, 815, 825; 719/328, 329; 707/706, 707

See application file for complete search history.

(56) References Cited

U.S. PATENT DOCUMENTS

| | | | |
|---|---|---|---|
| 2007/0234237 A1* | 10/2007 | Seemann ..................... | 715/853 |
| 2007/0256029 A1 | 11/2007 | Maxwell | |
| 2008/0163053 A1 | 7/2008 | Hwang et al. | |
| 2008/0201647 A1* | 8/2008 | Lagerstedt et al. ........... | 715/748 |
| 2009/0049412 A1 | 2/2009 | Lee et al. | |
| 2009/0132378 A1* | 5/2009 | Othmer et al. .................. | 705/14 |
| 2009/0150910 A1* | 6/2009 | Lyndersay et al. ............ | 719/328 |
| 2009/0271724 A1* | 10/2009 | Chaudhri et al. ............. | 715/769 |
| 2009/0327900 A1* | 12/2009 | Noll et al. ...................... | 715/733 |
| 2010/0070928 A1* | 3/2010 | Goodger et al. .............. | 715/838 |
| 2010/0082634 A1* | 4/2010 | Leban ........................... | 715/854 |
| 2011/0167350 A1* | 7/2011 | Hoellwarth ................... | 715/727 |
| 2011/0191314 A1* | 8/2011 | Howes et al. ................. | 707/706 |

FOREIGN PATENT DOCUMENTS

| | | |
|---|---|---|
| KR | 10-2008-0061708 | 7/2008 |
| KR | 10-2009-0017892 | 2/2009 |
| KR | 10-2011-0040087 | 4/2011 |

* cited by examiner

*Primary Examiner* — Haoshian Shih
(74) *Attorney, Agent, or Firm* — The Farrell Law Firm, P.C.

(57) ABSTRACT

A method and apparatus for providing a user interface in which user interfaces related to child elements are displayed on neighboring zones of a user interface related to a parent element. In the method, a first user interface related to a parent element that is associated with a plurality of child elements is displayed on a display screen. A plurality of second user interfaces related to the plurality of child elements are then displayed on neighboring zones of the first user interface.

16 Claims, 21 Drawing Sheets

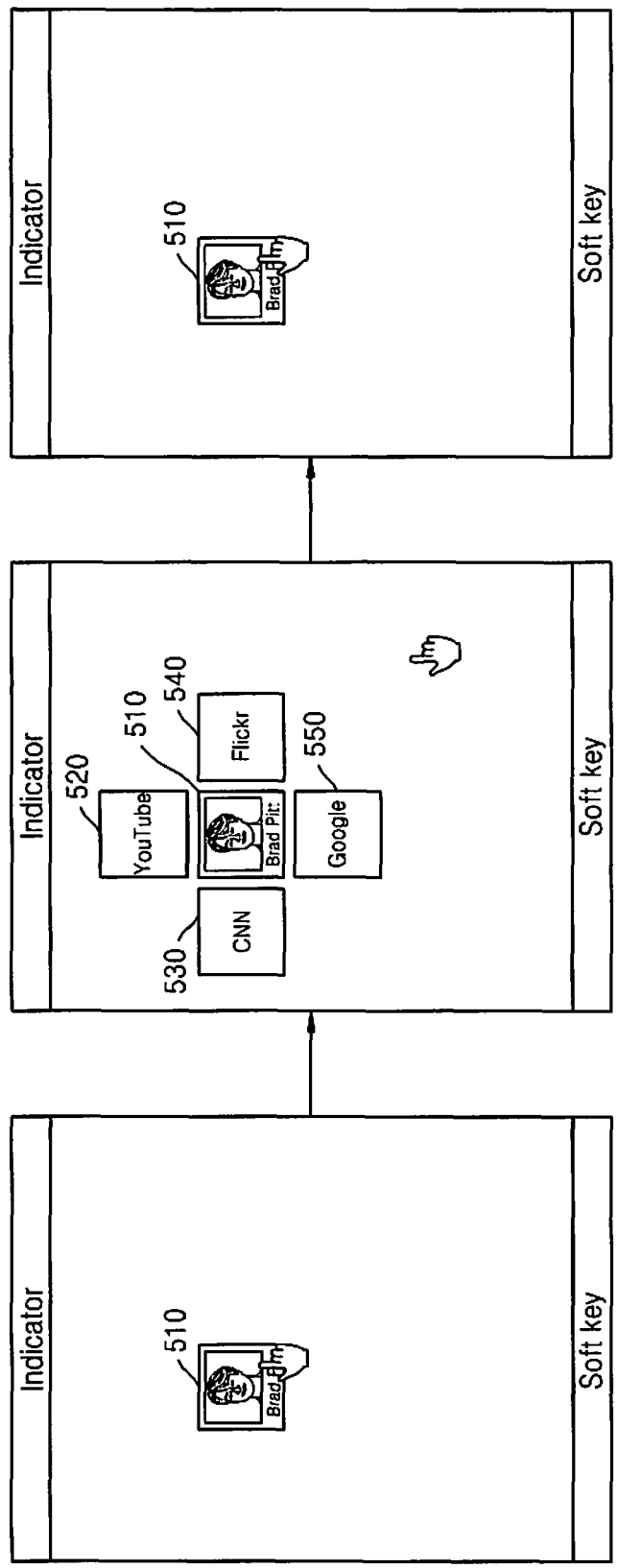

METHOD AND APPARATUS FOR PROVIDING A USER INTERFACE

PRIORITY

This application claims priority to Korean Patent Application Nos. 10-2010-0013602, 10-2010-0014744, and 10-2010-0066417, which were filed in the Korean Intellectual Property Office on Feb. 12, 2010, Feb. 18, 2010, and Jul. 9, 2010, respectively, the entire disclosures of which are hereby incorporated by reference.

BACKGROUND OF THE INVENTION

1. Field of the Invention

The present invention relates to a method and apparatus for providing a user interface on which a user desired service is easily accessible.

2. Description of the Related Art

As the performance of mobile devices improves, services provided to a user of a mobile device are diversifying. In order to use different services on a generally smaller screen of a mobile device, a user interface capable of easily and rapidly accessing a service is important.

SUMMARY OF THE INVENTION

Accordingly, an aspect of the present invention is to provide a method and apparatus for displaying a user interface capable of maximizing user convenience, and a computer-readable recording medium having recorded thereon a computer program for executing the method.

In accordance with an aspect of the present invention, a method of providing a user interface is provided. The method includes displaying a first user interface related to a parent element including a plurality of child elements; and displaying a plurality of second user interfaces related to the plurality of child elements on neighboring zones of the first user interface, if the first user interface is selected.

In accordance with another aspect of the present invention, an apparatus for providing a user interface is provided. The apparatus includes a control unit for generating a first user interface related to a parent element including a plurality of child elements, and generating a plurality of second user interfaces related to the plurality of child elements on neighboring zones of the first user interface, if the first user interface is selected; and a display unit for displaying the first user interface and the plurality of second user interfaces.

In accordance with another aspect of the present invention, a computer-readable recording medium is provided, which has recorded thereon, a computer program for executing the above method.

BRIEF DESCRIPTION OF THE DRAWINGS

The above and other aspects, features, and advantages of certain embodiments of the present invention will become more apparent from the following descriptions thereof with reference to the attached drawings, in which:

FIG. 5 illustrates a method of returning to a state when only a first user interface related to a parent element is displayed, according to an embodiment of the present invention;

DETAILED DESCRIPTION OF EMBODIMENTS OF THE INVENTION

Hereinafter, various embodiments of the present invention will be described in detail with reference to the attached drawings.

Figure 1A:
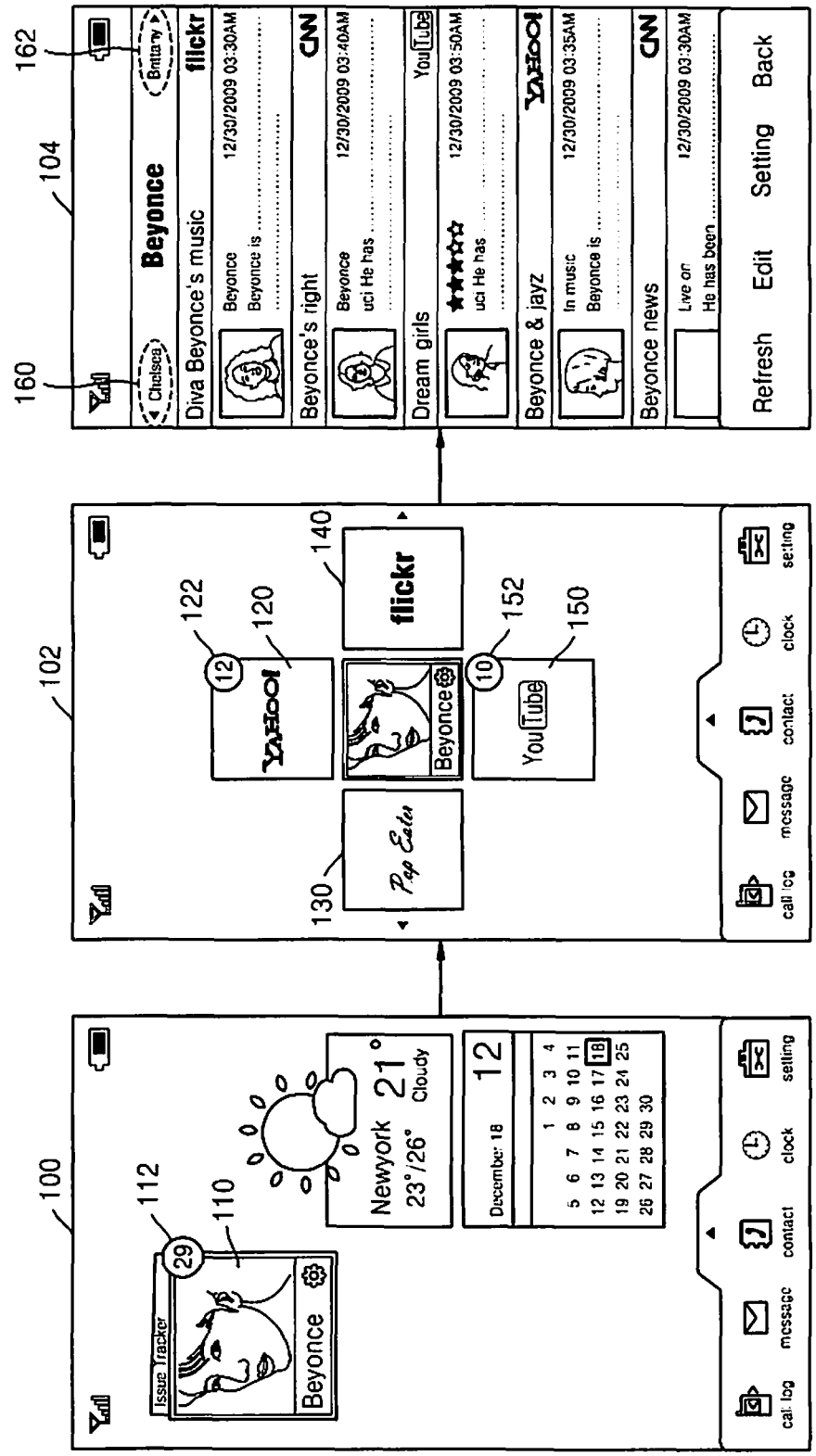
FIG. 1A illustrates user interfaces according to an embodiment of the present invention.

FIG. 1A illustrates user interfaces according to an embodiment of the present invention. For example, the user interfaces may be widgets.

Referring to FIG. 1A, an apparatus for providing a user interface displays on a screen 100 a first user interface 110 related to a parent element including a plurality of child elements.

The first user interface 110 is displayed on the screen 100 together with other user interfaces. For example, indicators for indicating a signal reception state and battery life of a mobile device may be displayed on a top portion of the screen 100, and soft keys for executing functions available on a current screen may be displayed on a bottom portion of the screen 100.

The first user interface 110 may be a user interface related to a keyword registered by the user. In FIG. 1A, the first user interface 110 is a user interface related to "Beyonce", i.e., a current keyword of the user. Also, the first user interface 110 includes a user interface 112 for indicating update content related to the keyword. The number of update content related to the keyword may be displayed as a number. In FIG. 1A, the user interface 112 indicates that there are 29 content updates related to "Beyonce".

Figure 1B:
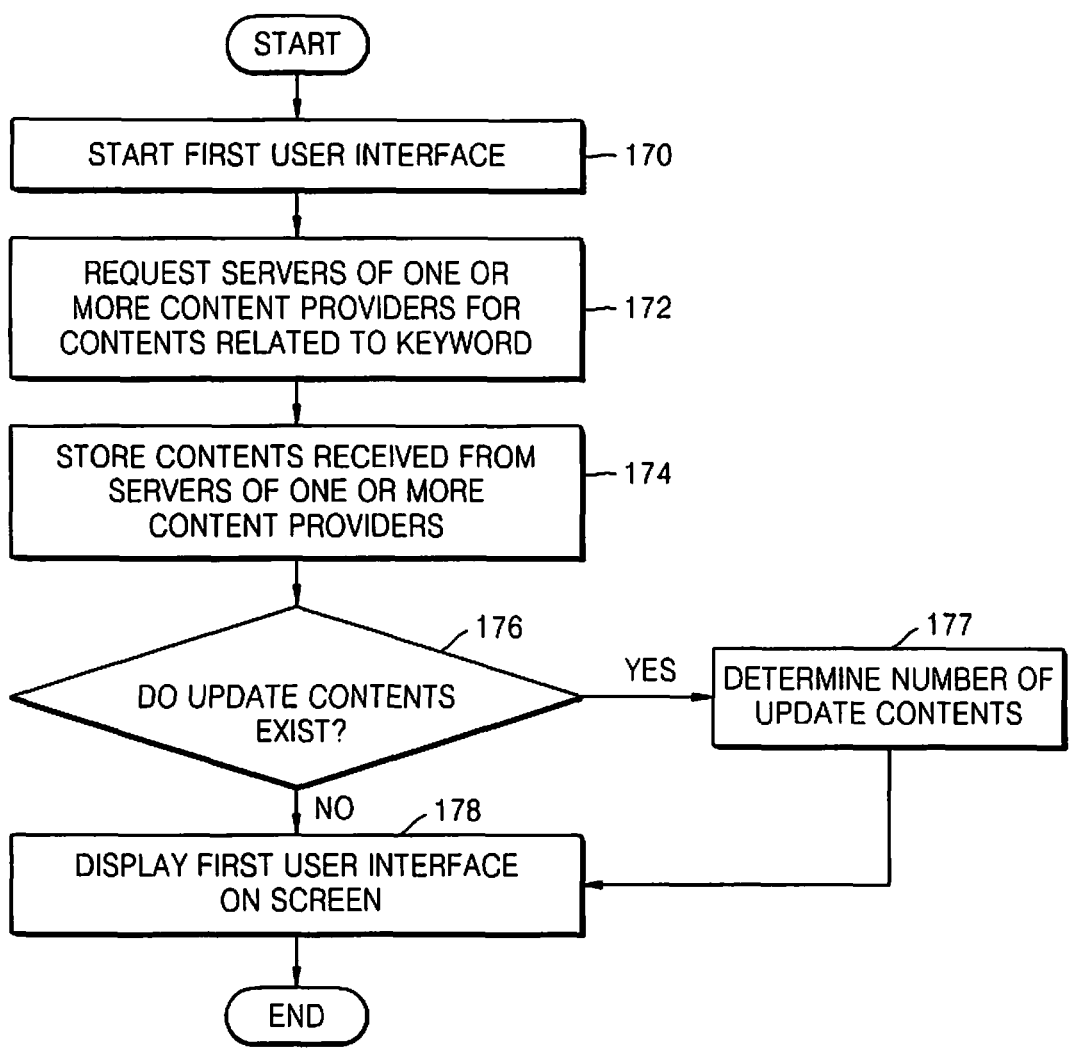
FIG. 1B is a flowchart illustrating a method of displaying a user interface according to an embodiment of the present invention.

FIG. 1B is a flowchart illustrating a method of displaying the first user interface 110 according to an embodiment of the present invention.

Referring to FIG. 1B, in step 170, the device displays the first user interface 110 on the screen 100. For example, the first user interface 110 may be displayed on the screen 100 by pressing an execution button for displaying the first user interface 110 on the screen 100, or by dragging the first user interface 110 located in a tray or a popup menu onto the screen 100 by using a drag & drop method.

In step 172, the device requests content related to a keyword from one or more content providers. The content providers may receive a request for content related to the keyword registered by the user of the device, or recommended by the device. A method of requesting for contents will be described in more detail below with reference to FIG. 1C.

In step 174, the device receives and stores the content related to the keyword from the content providers. For example, the content may include various multimedia content related to the keyword, e.g., news, images, and videos.

According to another embodiment of the present invention, instead of requesting and receiving content as illustrated in operations 172 and 174, the request might only be for whether the content providers have updated content related to the keyword. Information indicating a time when the content related to the keyword were last received may be provided as a request to the content providers, and information indicating whether updated content exists and information regarding the number of update content may be received in response to the request.

In step 176, the device determines whether the update content related to the keyword exist, based on the content received in step 174. If the received content is different from previously stored content, the device may determine that updated contents exist. Also, if information indicating whether the updated content exists is received from the content providers, whether update content exists is determined based on the received information.

In step 177, the device determines the number of update content. A total number of the update content related to the keyword is determined based on content received from all content providers. If the information regarding the number of update content is received from the content providers, the total number of update content related to the keyword is determined by summing the number of update contents from each content provider.

In step 178, the device displays the first user interface 110 on the screen 100. If the total number of update content related to the keyword is determined in step 177, information regarding the total number is also displayed on the user interface 112 of the screen 100.

Figure 1C:
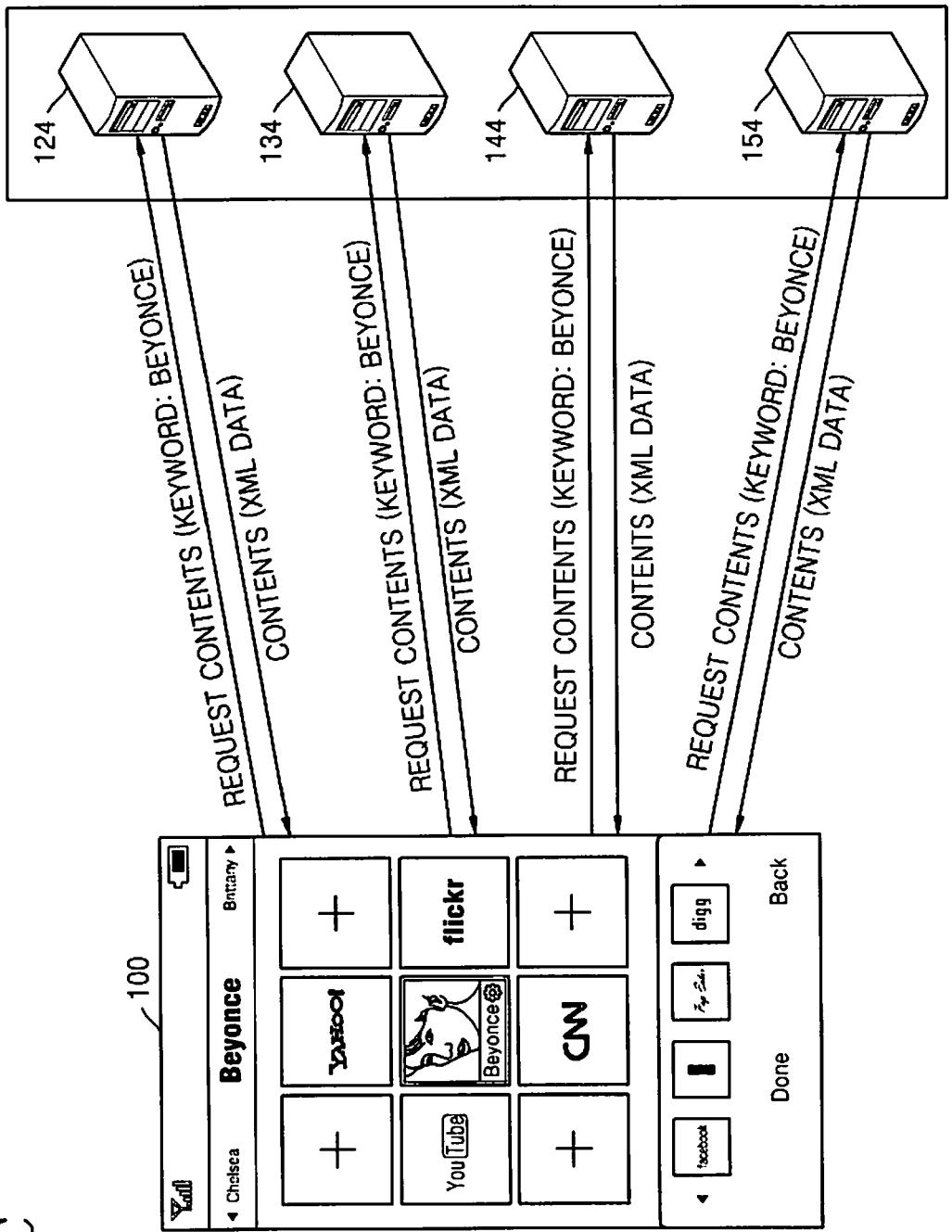
FIG. 1C is a diagram illustrating a method of receiving update content according to an embodiment of the present invention.

FIG. 1C illustrates a method of receiving update content according to an embodiment of the present invention.

Referring to FIG. 1C, the device receives content from one or more servers 124, 134, 144, and 154. Updated content is received from one or more servers operated by the content providers. A keyword of the first user interface 110 (e.g., Beyonce) is transmitted to the servers 124, 134, 144, and 154, and updated content is received in response to the transmitted keyword. The updated content may be received from the servers 124, 134, 144, and 154 in the form of eXtensible Markup Language (XML) documents.

Referring back to FIG. 1A, if the user selects the first user interface 110, e.g., by touching the screen 100 or by using another input apparatus, the first user interface 110 and a plurality of second user interfaces 120, 130, 140, and 150 are displayed on a subsequent screen 102. The second user interfaces 120, 130, 140, and 150 are user interfaces related to child elements. In order to represent correlations between the child elements of the second user interfaces 120, 130, 140, and 150 and the parent element of the first user interface 110, the second user interfaces 120, 130, 140, and 150 are displayed on the neighboring zones of the first user interface 110.

More specifically, in FIG. 1A, the second user interfaces 120, 130, 140, and 150 are displayed on the top, bottom, left, and right neighboring zones of the first user interface 110. The first user interface 110 may be a user interface related to the keyword, i.e., the parent element, and the second user interfaces 120, 130, 140, and 150 may be a plurality of user interfaces related to the child elements of the keyword, i.e., the content providers for providing the contents related to the keyword.

Although the second user interfaces 120, 130, 140, and 150 are displayed on the top, bottom, left, and right neighboring zones of the first user interface 110, the neighboring zones of the first user interface 110 are not limited thereto and may be any neighboring zones around the first user interface 110 in different directions. For example, the second user interfaces 120, 130, 140, and 150 may be displayed on one or more of top-left, bottom-left, top-right, and bottom-right neighboring zones of the first user interface 110.

The neighboring zones of the first user interface 110 may extend. For example, the second user interfaces 120, 130, 140, and 150 may be displayed on neighboring zones of one or more of the top, bottom, left, right, top-left, bottom-left, top-right, and bottom-right neighboring zones of the first user interface 110, and one or more other user interfaces may be additionally displayed on outer neighboring zones of the second user interfaces 120, 130, 140, and 150. Also, one or more other user interfaces may be additionally displayed on diagonal neighboring zones including the top-left, left bottom, top-right, and bottom-right neighboring zones of the first user interface 110.

In FIG. 1A, content providers that provide content related to the parent element "Beyonce" are set as the child elements, and the second user interfaces 120, 130, 140, and 150 related to the content providers are displayed around the first user interface 110 related to "Beyonce". The second user interfaces 120, 130, 140, and 150 may include user interfaces 122 and 152 for indicating updated content.

When the screen 100 changes into screen 102 and thus the second user interfaces 120, 130, 140, and 150 are displayed, various different effects may be used. These effects are not restricted. For example, the first user interface 110 may be unfolded in top, bottom, left, and right directions to display the second user interfaces 120, 130, 140, and 150. In this case, the first user interface 110 may be unfolded in top, bottom, left, and right directions as if pages of a book are turned, to display the second user interfaces 120, 130, 140, and 150. According to another embodiment of the present invention, the first user interface 110 may slide in top, bottom, left, and right directions to display the second user interfaces 120, 130, 140, and 150, respectively.

If the first user interface 110 is not located at the center of the screen 100, the first user interface 110 may be moved to the center of the screen 102 and then the second user interfaces 120, 130, 140, and 150 may be displayed on the neighboring zones of the first user interface 110. The first user interface 110 located at a left top portion of the screen 100 is moved to the center of the screen 102, and then is unfolded in top, bottom, left, and right directions to display the second user interfaces 120, 130, 140, and 150.

Also, when the first user interface 110 is relatively large in size for the display screen, if the first user interface 110 is unfolded in top, bottom, left, and right directions while maintaining the size, the second user interfaces 120, 130, 140, and 150 may be displayed beyond boundaries of the screen 102.

Alternatively, according to another embodiment of the present invention, the first user interface 110 may be moved to the center of the screen 102 and reduced in size. After the first user interface 110 is reduced in size so as to allow the first user interface 110 and the second user interfaces 120, 130, 140, and 150 to be displayed on the screen 102 at the same time, the reduced first user interface 110 may be unfolded to display the second user interfaces 120, 130, 140, and 150.

Although FIG. 1A illustrates the second user interfaces 120, 130, 140, and 150 being displayed on the neighboring zones of the first user interface 110, if the first user interface 110 is selected, alternatively, if the first user interface 110 is not displayed on the screen 100, e.g., is located in a tray or a popup menu, and is dragged onto the screen 100 by using a drag & drop method, together with the first user interface 110, the second user interfaces 120, 130, 140, and 150 may be automatically displayed on the neighboring zones of the first user interface 110. In this case, the dragged first user interface 110 may also be unfolded to display the second user interfaces 120, 130, 140, and 150, as described above.

Figure 1D:
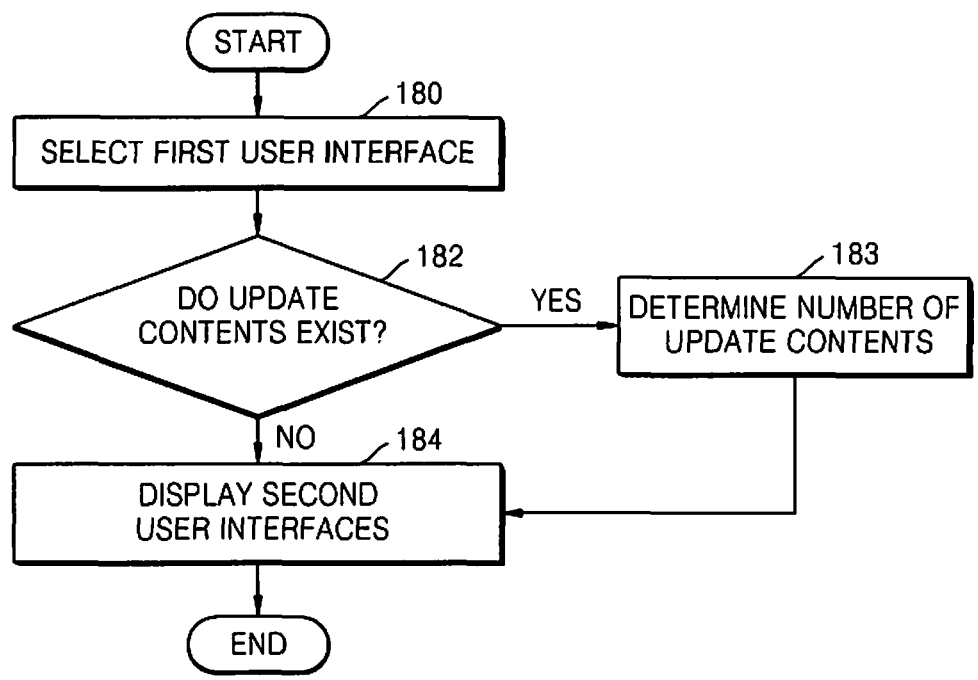
FIG. 1D is a flowchart illustrating a method of displaying a plurality of second user interfaces according to an embodiment of the present invention.

FIG. 1D is a flowchart illustrating a method of displaying the second user interfaces 120, 130, 140, and 150, according to an embodiment of the present invention.

Referring to FIG. 1D, in step 180, the user of the device selects the first user interface 110 displayed on the screen 100. For example, the first user interface 110 displayed on the screen 100 may be touched.

In step 182, the device determines whether each of the content providers has updated content. When the first user interface 110 is selected, the second user interfaces 120, 130, 140, and 150 are displayed, and the displayed second user interfaces 120, 130, 140, and 150 may include the user interfaces 122 and 152 for indicating a number of updated content. As such, the device determines whether each of the content providers has updated content. As described above in relation to FIG. 1B, if information indicating whether updated content exists and information indicating the number of updated content is received from the content providers, whether the updated content exists is determined based on the received information.

In step 183, the device determines the number of updated content of each of the content providers. If information regarding the number of update contents is received from each of the content providers, the number of update contents is determined based on the received information.

In step 184, the device displays on the screen 102 the second user interfaces 120, 130, 140, and 150 on which the numbers of updated content are displayed as illustrated in FIG. 1A. The second user interfaces 120, 130, 140, and 150 are displayed on the neighboring zones of the first user interface 110 together with the first user interface 110.

Referring back to FIG. 1A, when the user selects the first user interface 110 on the screen 102 on which the first user interface 110 and the second user interfaces 120, 130, 140, and 150 are displayed, a subsequent screen 104 including content is displayed.

Small images and abstracted information related to "Beyonce" are aligned in a certain order and are displayed on the screen 104. The order may be determined according to number of updates or the content providers. Because one of the second user interfaces 120, 130, 140, and 150 was not selected on the previous screen 102, the content of all content providers is displayed on screen 104.

Also, the screen 104 may include a user interface for changing the parent element. For example, a user interface 160 will change the parent element from "Beyonce" to "Chelsea" and a user interface 162 will change the parent element from "Beyonce" to "Brittany". Because the parent element may be changed on the last screen 104, an inconvenience of returning to the initial screen 100 to change the parent element may be prevented.

Figure 1E:
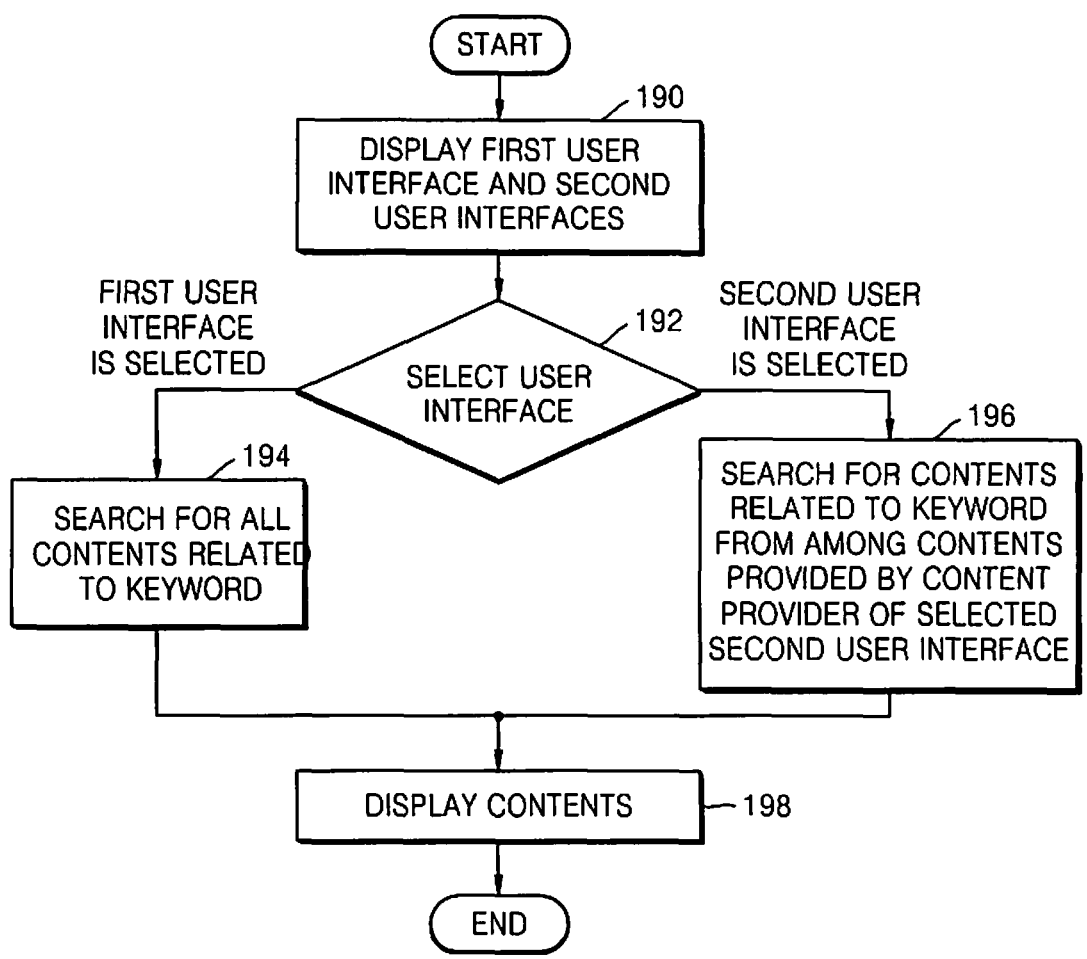
FIG. 1E is a flowchart illustrating a method of displaying content according to an embodiment of the present invention.

FIG. 1E is a flowchart illustrating a method of displaying content according to an embodiment of the present invention.

Referring to FIG. 1E, in step 190, the device displays the first user interface 110 and the second user interfaces 120, 130, 140, and 150 on the screen 102. As described above in relation to FIG. 1D, the second user interfaces 120, 130, 140, and 150 may be displayed on neighboring zones of the first user interface 110. The second user interfaces 120, 130, 140, and 150 are user interfaces related to the content providers.

In step 192, the user of the device selects one of the first user interface 110 and the second user interfaces 120, 130, 140, and 150. In FIG. 1A, one of the first user interface 110 and the second user interfaces 120, 130, 140, and 150 may be selected.

If the user selects the first user interface 110 in step 192, in step 194, the device searches for all content related to the keyword based on content received from the servers 124, 134, 144, and 154 operated by the content providers. Because the user re-selects the first user interface 110 related to the keyword in operation 192, instead of selecting one of the second user interfaces 120, 130, 140, and 150 related to the content providers, respectively, content is searched from all of the content providers. The device may search for content previously received from the servers 124, 134, 144, and 154 and stored in a storage of the device, or may request the servers 124, 134, 144, and 154 for the content related to the keyword and may receive the content in response to the request.

If the user selects one of the second user interfaces 120, 130, 140, and 150 in step 192, in step 196, the device searches for the content related to the keyword from among content provided by a content provider of the selected second user interface. That is, because the second user interfaces 120, 130, 140, and 150 are related to the content providers, i.e., the child elements of the keyword, when the user selects one of the second user interfaces 120, 130, 140, and 150 to display only the content of a certain content provider, the device searches for only the content related to the selected content provider, i.e., a child element, from among the contents related to the keyword, i.e., the parent element. Again, the device may search for content previously received from the servers 124, 134, 144, and 154 and stored in a storage of the device, or may request a server operated by a content provider related to the selected second user interface for the content related to the keyword and may receive the content in response to the request.

In step 198, the device display the content searched for in steps 194 or 196. If the content of all content providers is searched for in operation 194, all content related to the keyword are displayed, as illustrated on the screen 104 of FIG. 1A. However, if the content of the certain content provider are searched for in step 196, only the content related to the keyword, which is received from the certain content provider, is displayed.

Figure 2:
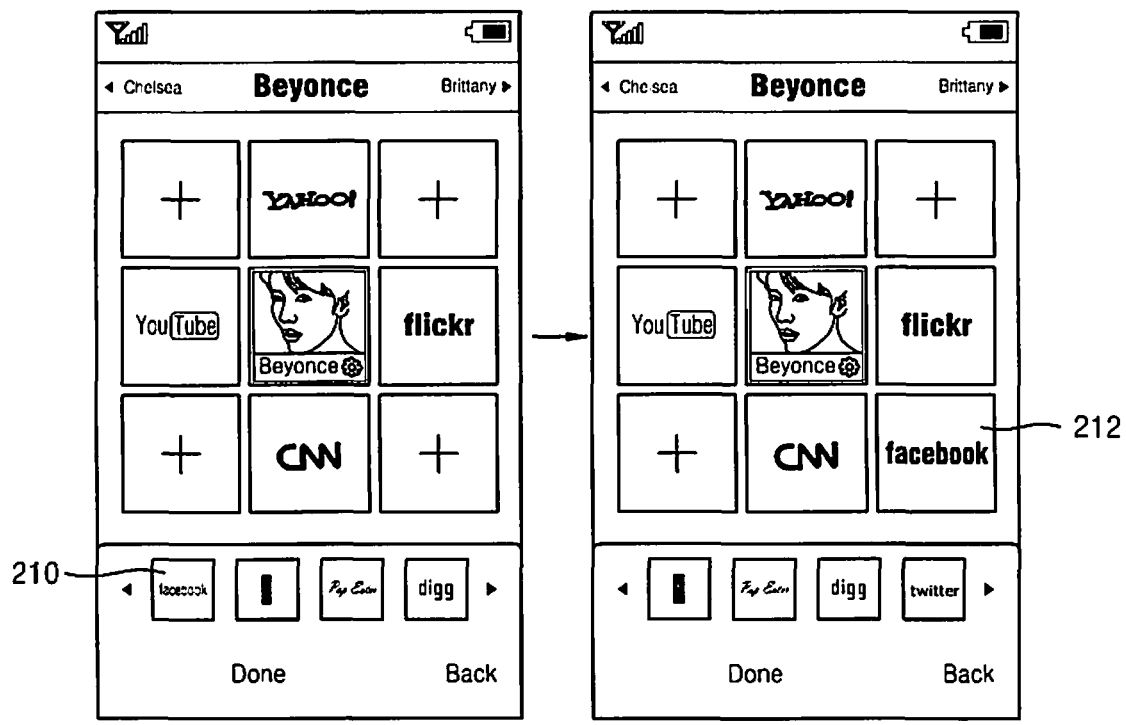
FIG. 2 illustrates screen images when editing second user interfaces related to child elements, according to an embodiment of the present invention.

FIG. 2 illustrates screen images when editing second user interfaces related to child elements, according to an embodiment of the present invention.

Referring to FIG. 2, the second user interfaces related to the child elements may be added or deleted according to user preference. A second user interface related to a child element may be added by selecting the second user interface displayed on a tray at a bottom portion of a screen and placing the second user interface at a neighboring location of a first user interface. Alternatively, the second user interface may be added by selecting one of the second user interfaces displayed on the tray, and selecting a location to which the selected second user interface is located, or by dragging and dropping one of the second user interfaces from the tray to a certain location.

In FIG. 2, for example, from among content providers, i.e., child elements, for providing contents related to "Beyonce", i.e., a parent element, a second user interface 210 related to facebook® is dragged and dropped to a bottom-right neighboring zone of a first user interface, thereby adding the second user interface 212.

Figure 3:
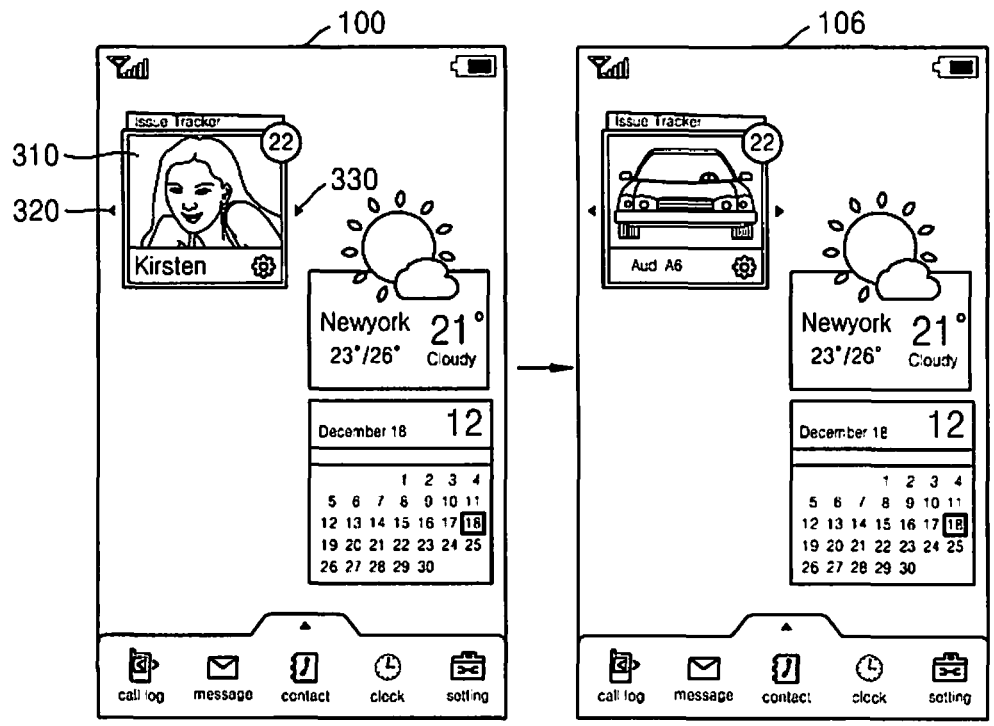
FIG. 3 illustrates screen images when changing a parent element on a user interface related to the parent element, according to an embodiment of the present invention.

FIG. 3 illustrates screen images when changing a parent element on a user interface related to the parent element, according to an embodiment of the present invention.

Referring to FIG. 3, a user may change the parent element on the screen 100 on which only the user interface related to the parent element, i.e., a first user interface 310, is displayed. In order to provide access to a plurality of parent elements on a restricted screen, a first user interface 310 may be displayed on the screen and the parent element may be changed. Accordingly, the first user interface 310 may include user interfaces 320 and 330, e.g., scroll arrows, for changing the parent element.

When the user selects one of the user interfaces 320 and 330 for changing the parent element, the first user interface 310 is changed into a user interface related to "Audi A6" on a subsequent screen 106.

Figure 4A:
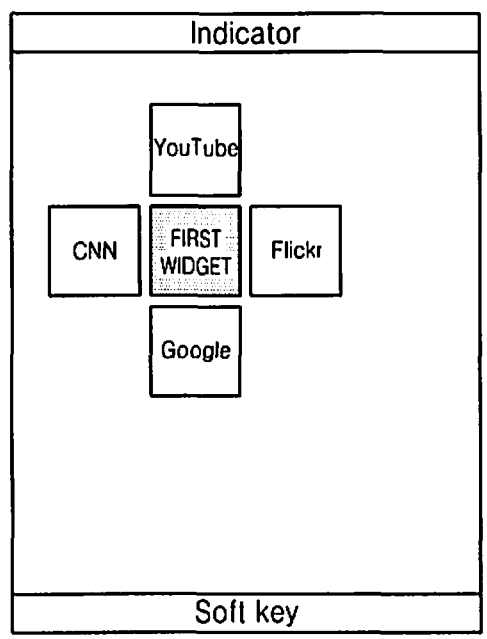
FIGS. 4A through 4C illustrate alignments of a first user interface related to a parent element and a plurality of second user interfaces related to child elements, according to different embodiments of the present invention.
Figure 4B:
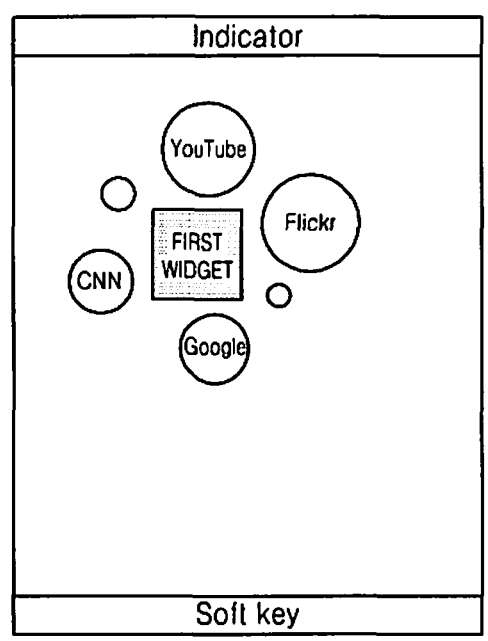
Figure 4C:
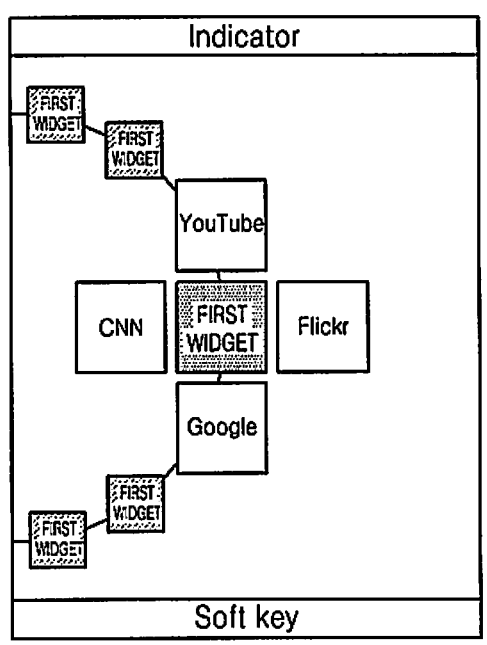

FIGS. 4A through 4C illustrate alignments of a first user interface related to a parent element and a plurality of second user interfaces related to child elements, according to different embodiments of the present invention. In FIGS. 4A through 4C, for example, the first and second user interfaces are widgets.

FIG. 4A illustrates second widgets related to child elements being aligned on the top, bottom, left, and right neighboring zones of a first widget related to a parent element, as described above in relation to FIGS. 1A, 2, and 3. Although, the first and second widgets have the same rectangular shape and have the same size in FIG. 4A, the sizes may vary.

FIG. 4B illustrates various-sized, circular second widgets being aligned on neighboring zones of a square first widget related to a parent element.

FIG. 4C illustrates a plurality of first widgets related to parent elements being displayed on the same screen. The second widgets are aligned as illustrated in FIG. 4A. However, FIG. 4C is different from FIG. 4A in that a current first widget and other first widgets are displayed on a screen.

FIG. 5 illustrates a method of returning to a state when only a first user interface related to a parent element is displayed, according to an embodiment of the present invention.

When a user selects a first user interface 510, a plurality of second user interfaces 520, 530, 540, and 550 related to a plurality of child elements of the parent element of the first user interface 510 are displayed on neighboring zones of the first user interface 510. Thereafter, if the user selects an area of the screen on which the first user interface 510 and the second user interfaces 520, 530, 540, and 550 are not displayed, the second user interfaces 520, 530, 540, and 550 disappear and the screen returns to the state when only the first user interface 510 is displayed.

Alternatively, the second user interfaces 520, 530, 540, and 550 may disappear when the user does not enter any input for a certain period of time.

Figure 6A:
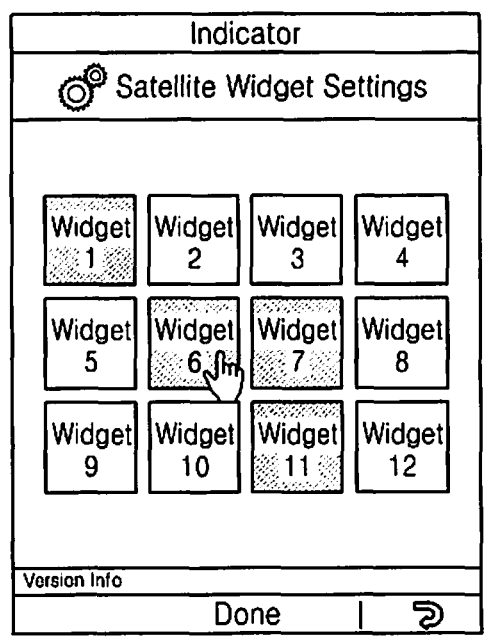
FIGS. 6A and 6B illustrate methods of selecting a plurality of second user interfaces related to child elements, according to different embodiments of the present invention.
Figure 6B:
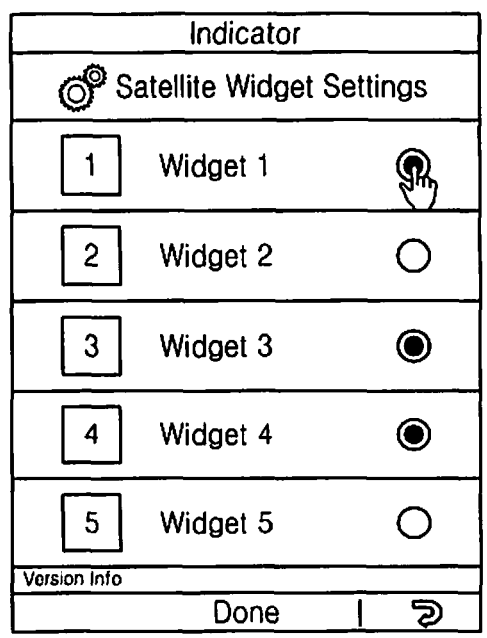

FIGS. 6A and 6B illustrate methods of selecting a plurality of second user interfaces related to child elements, according to different embodiments of the present invention.

As described above in relation to FIG. 2, second user interfaces related to child elements may be selected and displayed on a screen by using a drag & drop method. However, as illustrated in FIG. 6A, second user interfaces to be displayed on neighboring zones of a first user interface may also be selected from among a plurality of second user interfaces (widgets) displayed on a main screen, instead of a tray. For example, a user may select the second user interfaces to be displayed on the neighboring zones of the first user interface, as illustrated in FIG. 6A, and the selected second user interfaces may be displayed according to a certain rule.

Further, as illustrated in FIG. 6B, second user interfaces to be displayed on neighboring zones of a first user interface may be selected by checking selection boxes on a list of a plurality of second user interfaces (e.g., widgets).

Figure 7:
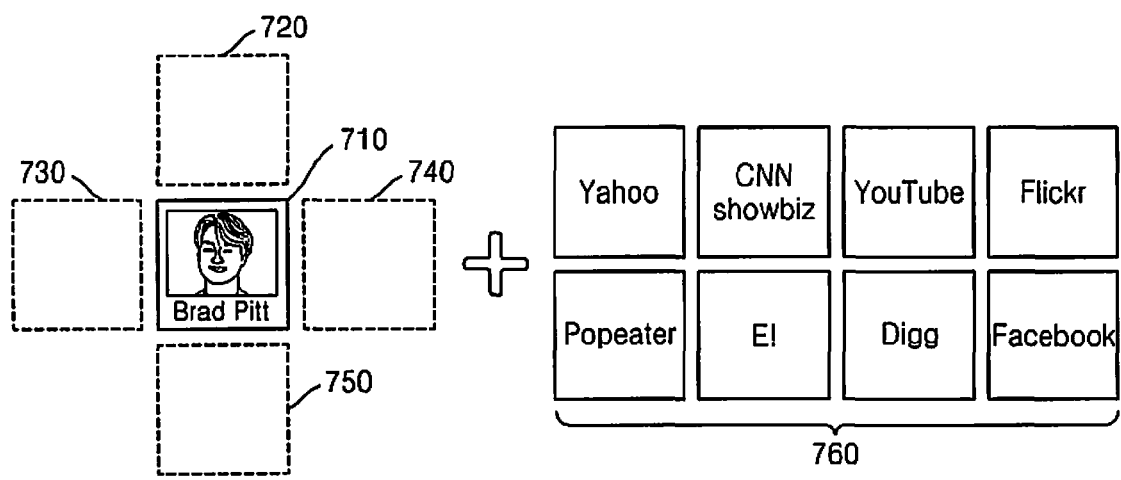
FIG. 7 illustrates a user interface related to a keyword, according to an embodiment of the present invention.

FIG. 7 illustrates a user interface related to a keyword, according to an embodiment of the present invention.

Referring to FIG. 7, a first user interface 710 is related to the keyword "Brad Pitt". The keyword may be registered by a user on a device for displaying user interfaces, or may be recommended by the device. The user may register the keyword desired by the user to continuously receive related information via a certain user interface.

Alternatively, the keyword may be recommended by the device to the user according to a certain algorithm. The keyword may be recommended by analyzing characteristics of the user, e.g., a current location of the device of the user, an address of the user, and hobbies of the user. Also, a communication carrier for providing a mobile communication service to the user may analyze the characteristics of the user to recommend the keyword of the first user interface 710.

If the keyword desired by the user to continuously receive related information is a parent element, content providers for providing content related to the keyword may be child elements.

In FIG. 7, the available content providers for providing content, e.g., news, videos, and images related to Brad Pitt include, e.g., Yahoo®, CNN showbiz®, YouTube®, Flickr®, Popeater®, E!®, Digg®, and facebook®, may be the child elements.

Accordingly, when the first user interface 710 is a user interface related to the parent element, i.e., the keyword, a plurality of second user interfaces 760 related to the child elements, i.e., the content providers, may be displayed on neighboring zones 720, 730, 740, and 750 of the first user interface 710.

Figure 8:
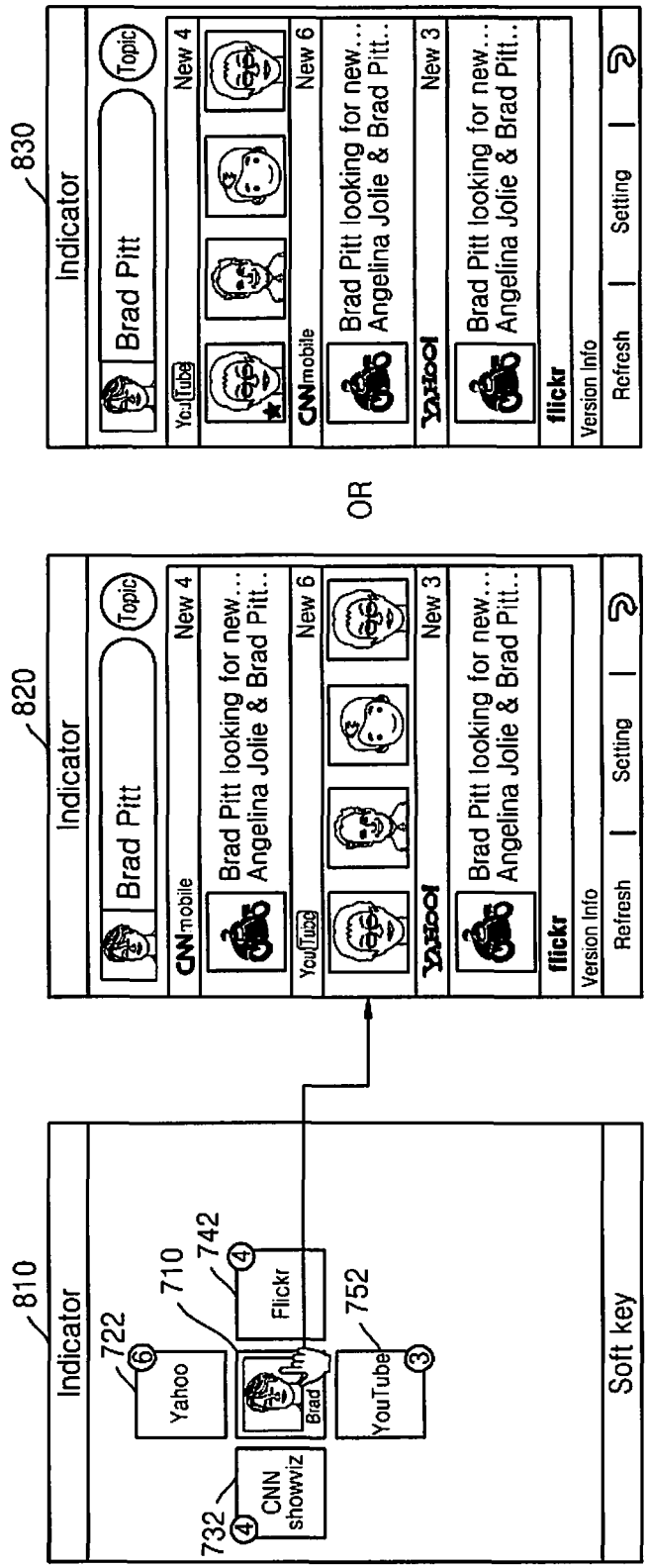
FIGS. 8 and 9 illustrate screen images when displaying a user interface related to a keyword, according to different embodiments of the present invention.

FIG. 8 illustrates screen images when displaying a user interface related to a keyword, according to an embodiment of the present invention.

Referring to FIG. 8, a first user interface 710 and a plurality of second user interfaces 722, 732, 742, and 752 are displayed on a screen 810.

When a user selects the first user interface 710 on the screen 810, content related to the keyword registered by the user, i.e., Brad Pitt, is displayed. Because the user did not select one of the second user interfaces 722, 732, 742, and 752, content from all content providers are displayed on a screen 820.

When the content is displayed, content of a recently frequently used content provider may be located at an upper portion of a screen 830. For example, if the user most often uses YouTube®, content from YouTube® is located at an upper portion of the screen 830 with respect to contents of the other content providers.

Figure 9:
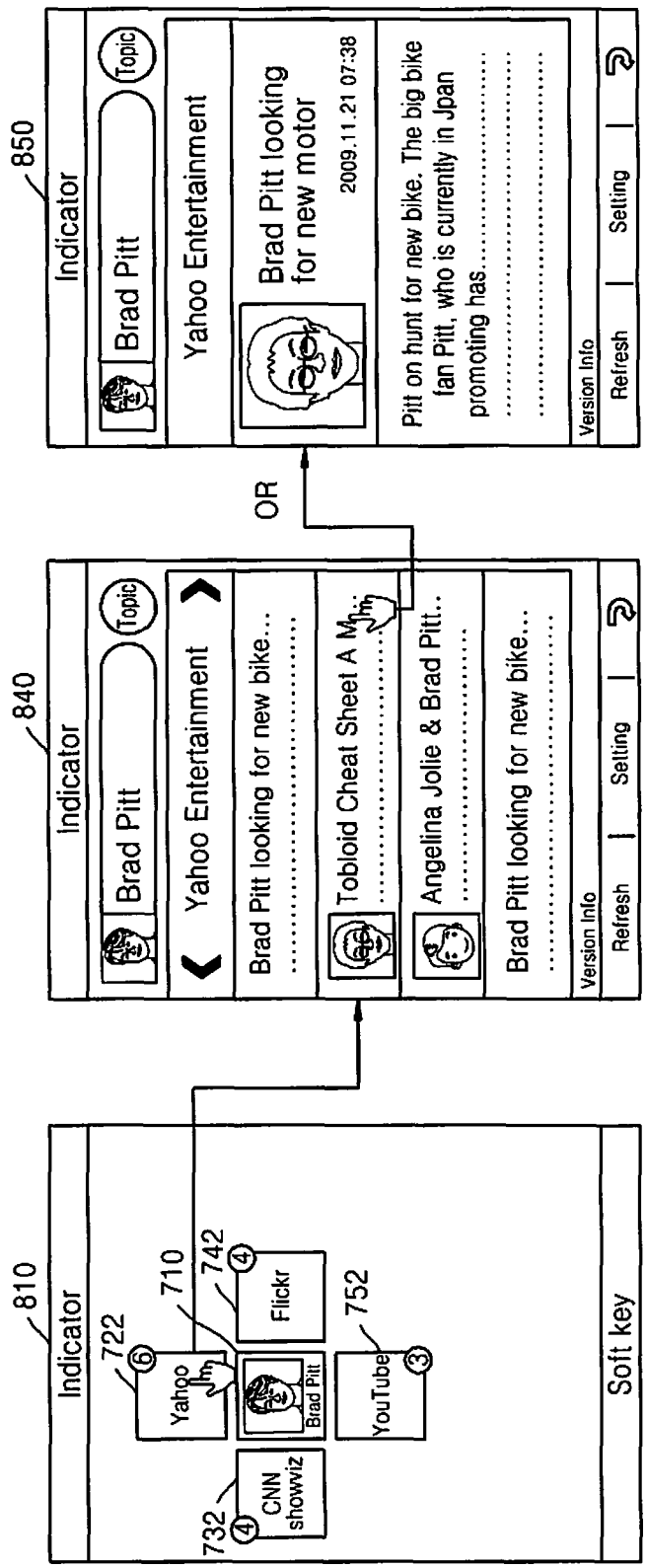

FIG. 9 illustrates screen images when displaying a user interface related to a keyword, according to another embodiment of the present invention.

When the user selects the second user interface 722 related to Yahoo®, instead of the first user interface 710, content from Yahoo® is displayed on a screen 840. Thereafter, when the user selects one of the content items based on abstracted information displayed on the screen 840, the selected content is displayed on a screen 850.

Although FIG. 9 illustrates the user selecting the second user interface 722, when the user selects the second user interface 732, 742, or 752 similar abstracted information will be displayed for the selected second user interface 732, 742, or 752. However, the configurations of the screen 840 for displaying the abstracted information of the content and the screen 850 for displaying the whole selected content may differ.

For example, if the user selects the second user interface 752 related to YouTube® for providing videos, abstracted information of the videos related to Brad Pitt will be displayed on the screen 840. Then, if the user selects a certain video on the screen 840, the selected video will be reproduced on the subsequent screen 850. Further, if the user selects the second user interface 742 related to Flickr® for providing images, thumb-nails of images related to Brad Pitt will be displayed on the screen 840. Then, if the user selects a certain thumb-nail image on the screen 840, the selected image will be magnified and displayed on the subsequent screen 850.

Figure 10:
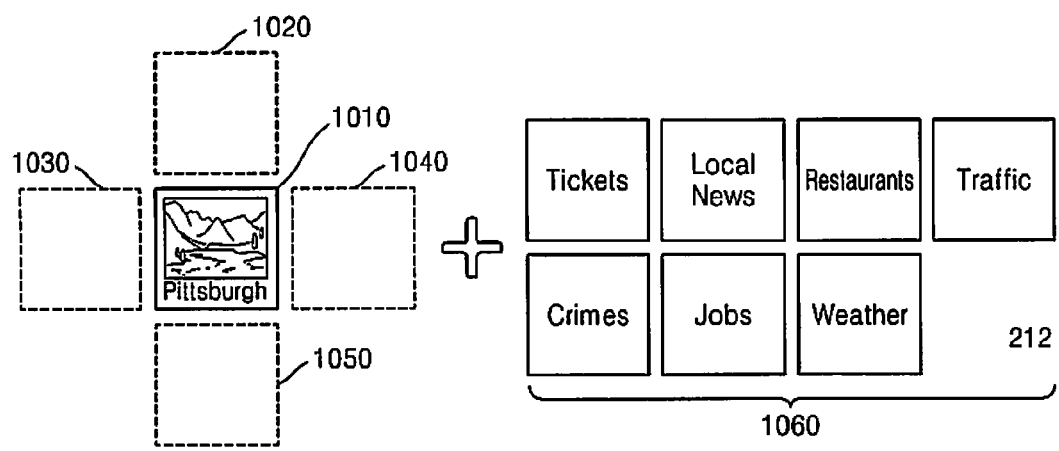
FIG. 10 illustrates a user interface related to a name of a region, according to an embodiment of the present invention.

FIG. 10 illustrates a user interface related to a name of a region, according to an embodiment of the present invention.

Referring to FIG. 10, a first user interface 1010 may be the user interface related to the name of the region, e.g., Pittsburgh. If the name of the region desired by a user to continuously receive related information is a parent element, categories of information related to the region may be child elements. In FIG. 10, the categories of information related to the region, e.g., "Tickets", "Local News", "Restaurant", "Traffic", "Crimes", "Jobs", and "Weather", may be the child elements. Tickets is a category of information regarding tickets for concerts, sports games, exhibitions, movies, etc. in the region, Local News is a category of news in the region, Restaurants is a category of information regarding restaurants in the region, Traffic is a category of information regarding traffic in the region, Crime is a category of information regarding criminal records and crime-ridden areas in the region, Jobs is a category of information regarding job opportunities in the region, and Weather is a category of information regarding the weather in the region.

Accordingly, if the first user interface 1010 is a user interface related to the parent element, i.e., the name of the region, a plurality of second user interfaces 1060 related to the child elements, i.e., the categories of information, may be displayed on neighboring zones 1020, 1030, 1040, and 1050 of the first user interface 1010.

Figure 11:
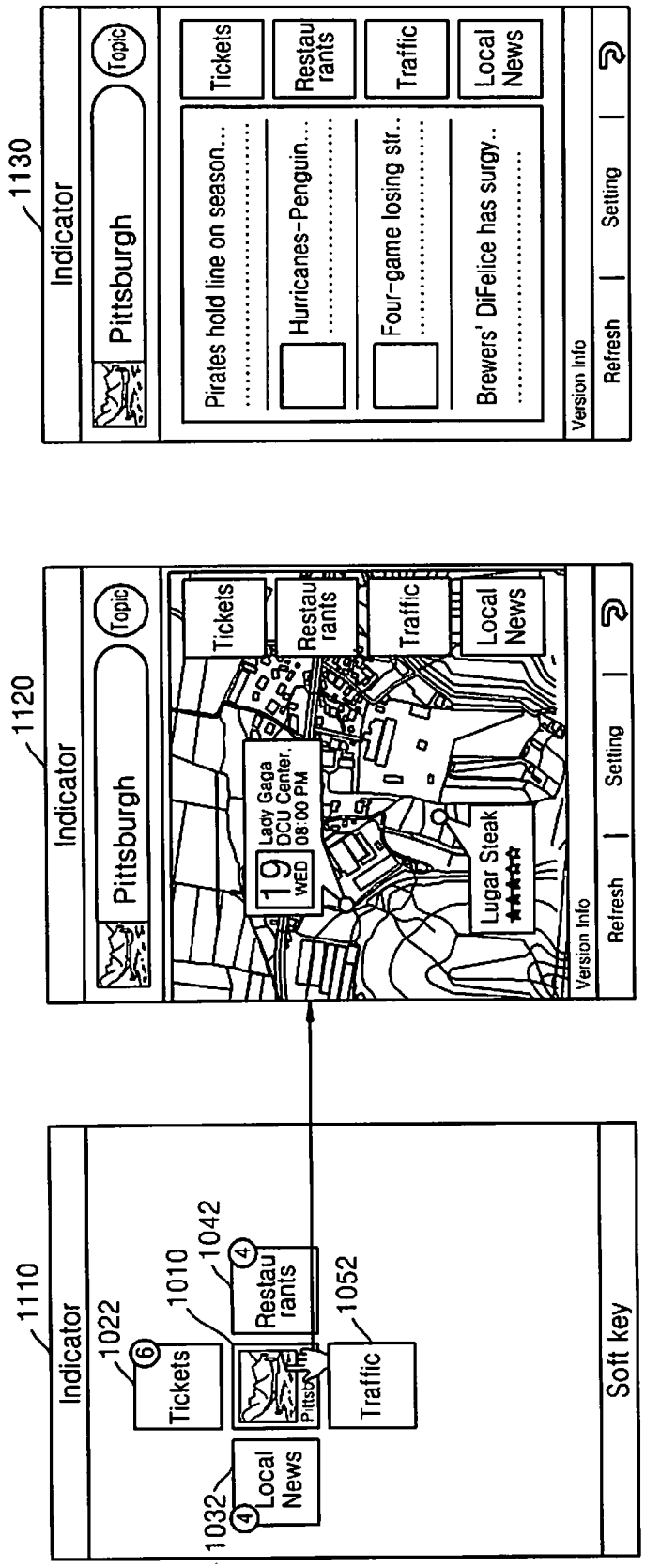
FIG. 11 illustrates screen images when displaying a user interface related to a name of a region, according to an embodiment of the present invention.

FIG. 11 illustrates screen images when displaying a user interface related to a name of a region, according to an embodiment of the present invention.

Referring to FIG. 11, a first user interface 1010 and a plurality of second user interfaces 1022, 1032, 1042, and 1052 are displayed on a screen 1110.

When a user selects the first user interface 1010 on the screen 1110, four categories of information related to the region registered by the user, i.e., Pittsburgh, are displayed on a screen 1120. Because the user did not select one of the second user interfaces 1022, 1032, 1042, and 1052, information of all of categories, i.e., tickets, restaurants, traffic, and local news, are displayed on the screen 1120. In this case, abstracted information regarding the categories may be displayed on a map of a corresponding region.

Alternatively, information of a certain category set by default may be displayed on a screen 1130. For example, information of "Local News" may be displayed on the screen 1130 by default according to a setting of the user or a device.

When the user selects one of the second user interfaces related to a certain category 1022, 1032, 1042, and 1052, instead of the first user interface 1010, information of only the selected category is displayed on a subsequent screen.

For example, when the user selects the second user interface 1022 related to "Tickets", a screen for selecting concerts, sports games, exhibitions, movies, etc., in the corresponding region is displayed. If the user selects one category from among concerts, sports games, exhibitions, and movies, detailed information related to tickets of the selected category will be displayed on the subsequent screen.

Likewise, when the user selects the second user interface 1032 related to "Local News", abstracted information of one or more news in the corresponding region is displayed on the screen. If the user selects one of the news based on the abstracted information, the whole selected news will be displayed on the subsequent screen.

Further, when the user selects the second user interface 1042 related to "Restaurants", abstracted information of restaurants in the corresponding region is displayed on the screen. If the user selects one of the restaurants based on the abstracted information, detailed information including a location and a phone number of the selected place is displayed on the subsequent screen. In this case, reviews of people who have previously visited the selected place may also be displayed. Furthermore, a user interface for making a phone call to the selected place and a user interface for viewing a map of the selected place may also be displayed together with the detailed information.

When the user selects the second user interface 1052 related to "Traffic", traffic information may be displayed on the map of the corresponding region.

Figure 12:
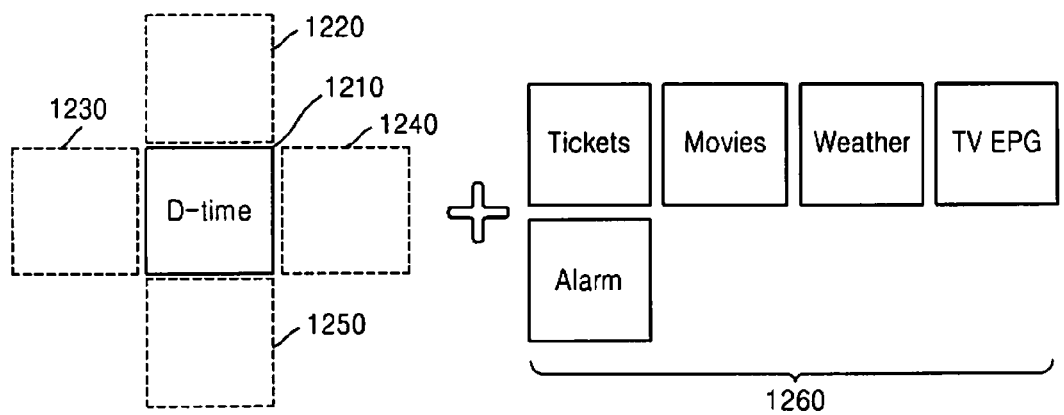
FIG. 12 illustrates a user interface related to a certain time, according to an embodiment of the present invention.

FIG. 12 illustrates a user interface related to a certain time, according to an embodiment of the present invention.

Referring to FIG. 12, a first user interface 1210 may be the user interface related to the certain time. If the certain time desired by a user to continuously receive related information is a parent element, the child elements may be categories of information related to the certain time. In FIG. 12, the categories of information related to the certain time are Tickets, Movies, Weather, TV Electronic Program Guide (EPG), and Alarm. Tickets is a category of information regarding tickets for concerts, sports games, exhibitions, etc., available at the certain time input by the user, Movies is a category of information regarding movies available at the certain time, TV EPG is a category of information regarding TV programs broadcast at the certain time, Weather is a category of information regarding weather at the certain time, and Alarm is a category related to an alarm setting at the certain time.

Accordingly, when the first user interface 1210 is a user interface related to the parent element, i.e., the certain time, a plurality of second user interfaces 1260 related to the child elements, i.e., the categories of information, may be displayed on neighboring zones 1220, 1230, 1240, and 1250 of the first user interface 1210.

Figure 13:
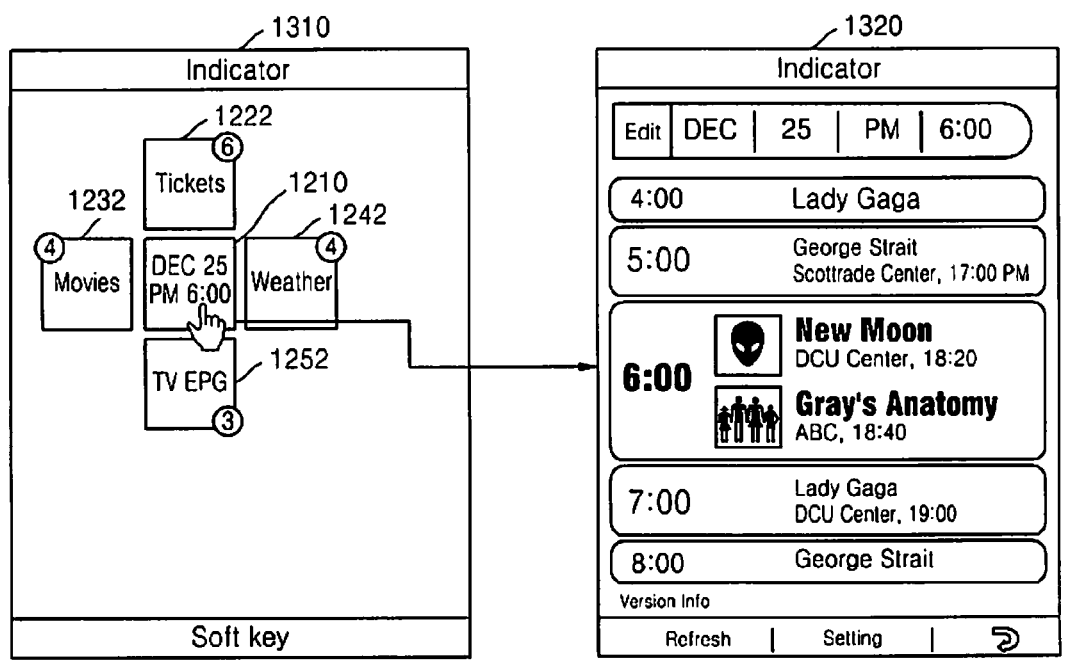
FIG. 13 illustrates screen images when displaying a user interface related to a certain time, according to an embodiment of the present invention.

FIG. 13 illustrates screen images when displaying a user interface related to a certain time, according to an embodiment of the present invention.

Referring to FIG. 13, a first user interface 1210 and a plurality of second user interfaces 1222, 1232, 1242, and 1252 are displayed on a screen 1310.

When a user selects the first user interface 1210 on the screen 1310, one or more pieces of information related to the certain time registered by the user are displayed. That is, because the user did not select one of the second user interfaces 1222, 1232, 1242, and 1252, information of all categories are displayed on a screen 1320. For example, Tickets, Movies, TV programs, Weather, etc., at the certain time are displayed on the screen 1320.

When the user selects one of the second user interfaces related to a certain category 1222, 1232, 1242, and 1252, instead of the first user interface 1210, information of only the selected category is displayed on a subsequent screen.

For example, if the user selects the second user interface 1222 related to Tickets, abstracted information of concerts, sports games, and exhibitions starting at the certain time will be displayed on the subsequent screen. If the user selects one item from among the concerts, sports games, and exhibitions based on the abstracted information, detailed information of the selected item will be displayed on the subsequent screen. In order to allow the user to check a place for the selected concert, sports games, and exhibition, a user interface related to a map may also be displayed together with the detailed information.

If the user selects the second user interface 1232 related to Movies, abstracted information of movies starting at the certain time is displayed on the subsequent screen. Thereafter, if the user selects one movie based on the abstracted information, detailed information of the selected movie will be displayed on the subsequent screen. As in the second user interface 1222 related to Tickets, in order to allow the user to check a theater for the selected movie, a user interface related to a map may also be displayed together with the detailed information.

If the user selects the second user interface 1242 related to Weather, weather information at the certain time will be displayed on the subsequent screen. Because weather may change according to time zones, weather information at the certain time registered by the user is displayed on the subsequent screen.

If the user selects the second user interface 1252 related to TV EPG, abstracted information of TV programs starting at the certain time is displayed on the subsequent screen. If the user selects one TV program based on the abstracted information, detailed information of the selected TV program will be displayed on the subsequent screen. In order to remind the user about the start of the selected TV program, a user interface for setting an alarm at a start time of the selected TV program may also be displayed together with the detailed information.

Figure 14A:
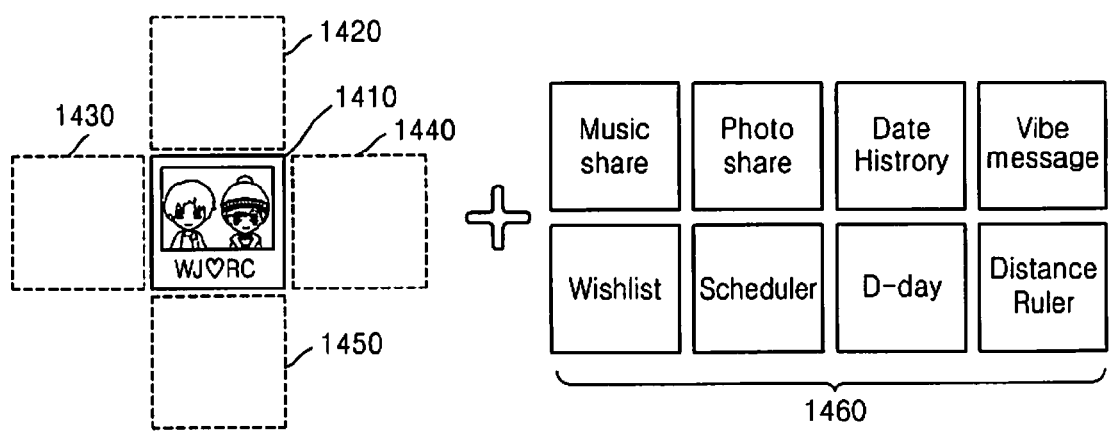
FIG. 14A illustrates a user interface related to an association between devices, according to an embodiment of the present invention.

FIG. 14A illustrates a user interface related to association between devices, according to an embodiment of the present invention.

Referring to FIG. 14A, a first user interface 1410 is related to the association between the devices. Because the association between the devices is a parent element, the types of the association between devices, e.g., Music share, Photo share, Date History, Vibe message, Wishlist, Scheduler, D-day, and Distance Ruler, may be the child elements. Music share indicates sharing music files between devices, Photo share indicates sharing photos between devices, Date History indicates recording times and locations when devices are located within a certain distance, Vibe Message indicates transmission of a vibe message, Wishlist indicates sharing a list of desired items, Scheduler indicates sharing schedules, Distance Ruler indicates a distance and a direction between devices, and D-day indicates a count from or to a certain date.

Accordingly, if the first user interface 1410 is a user interface related to the parent element, i.e., the association between the devices, a plurality of second user interfaces 1460 related to the child elements, i.e., the types of the association, may be displayed on neighboring zones 1420, 1430, 1440, and 1450 of the first user interface 1410.

Figure 14B:
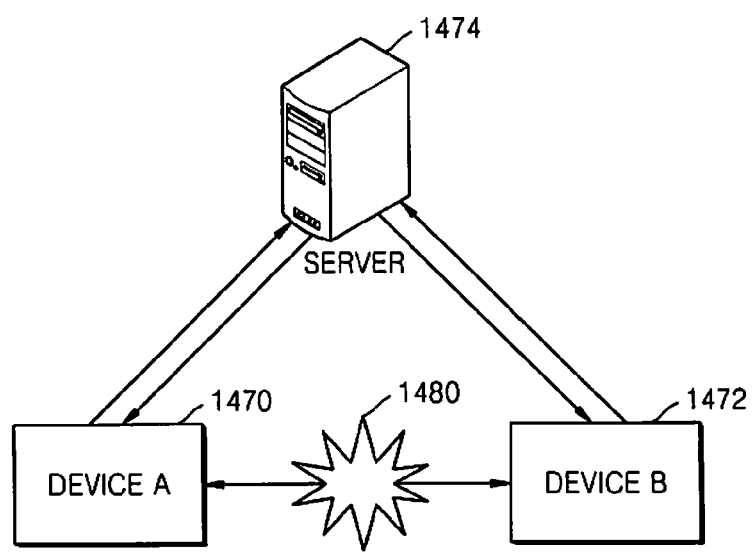
FIG. 14B is a diagram illustrating data sharing between devices, according to an embodiment of the present invention.

FIG. 14B illustrates a method of sharing data between devices, according to an embodiment of the present invention.

Referring to FIG. 14B, association between devices based on the user interface illustrated in FIG. 14A may be performed based on a location and a time. For example, users of two devices, e.g., a device A 1470 and a device B 1472, perform a certain action 1480 on the device A 1470 and the device B 1472 in order to share data. The device A 1470 and the device B 1472 may bump against each other or may be shaken in a certain direction. Motions of the device A 1470 and the device B 1472 may be sensed by using gravity sensors included in the device A 1470 and the device B 1472.

If the certain action 1480 is performed by the users, the device A 1470 and the device B 1472 transmit action information to a server 1474. When the action information is transmitted, the device A 1470 and the device B 1472 also transmit location information and action generation time information. The server 1474 determines whether the device A 1470 and the device B 1472 satisfy a condition for sharing data with each other, based on the received action information, the location information, and the action generation time information. If the device A 1470 and the device B 1472 perform the same action, are located in a close distance, and perform the action at the same time, the server 1474 may determine that the condition for sharing data is satisfied. If the condition for sharing data is satisfied, the server 1474 may receive data from the device A 1470 to transmit the received data to the device B 1472, and may receive data from the device B 1472 to transmit the received data to the device A 1470.

Figure 15A:
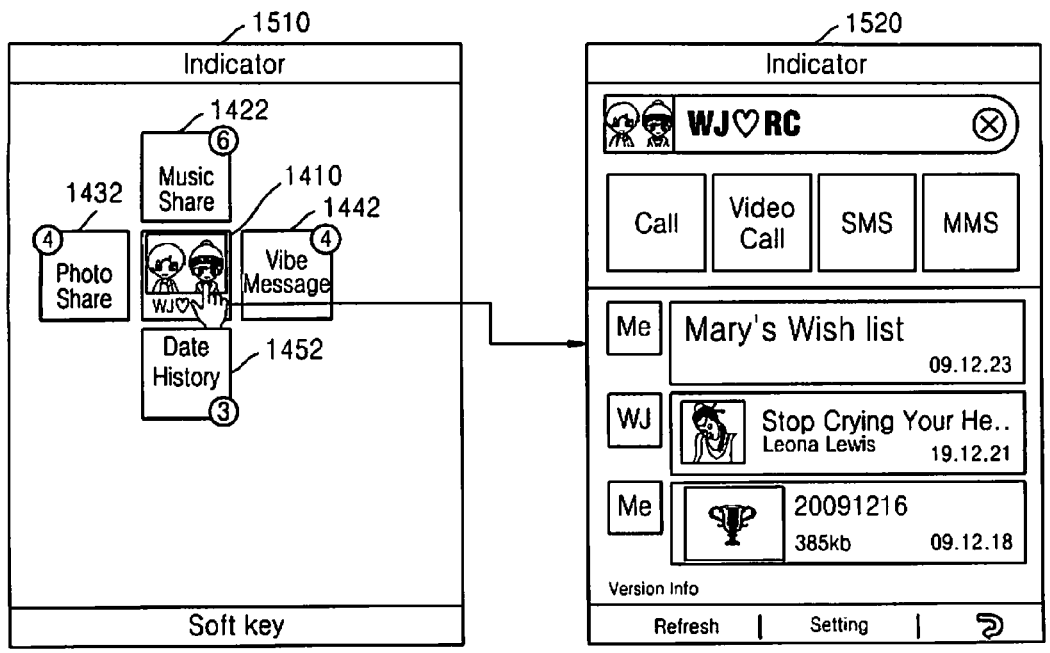
FIG. 15A illustrates screen images when displaying a user interface related to association between devices, according to an embodiment of the present invention.

FIG. 15A illustrates screen images when displaying a user interface related to association between devices, according to an embodiment of the present invention.

Referring to FIG. 15A, a first user interface 1410 and a plurality of second user interfaces 1422, 1432, 1442, and 1452 are displayed on a screen 1510.

If a user selects the first user interface 1410 on the screen 1510, one or more pieces of abstracted information related to the association between the devices are displayed. Again, because the user did not select one of the second user interfaces 1422, 1432, 1442, and 1452, abstracted information related to all previous associations between the devices regardless of types of the association is displayed on a screen 1520. Further, if a user selects the first user interface 1410 on the screen 1510, menus for connecting with the specific user arc displayed. The menus may include a call, a video call, a Short Message Service (SMS), and a Multimedia Messaging Service (MMS).

If the user selects one of the second user interfaces 1422, 1432, 1442, and 1452 related to a certain category respectively, instead of the first user interface 1410, information of only the selected category will be displayed on a subsequent screen.

For example, if the user selects the second user interface 1422 related to Music share, a list of music files previously shared with other devices is displayed on the subsequent screen. A user interface for adding music files to be shared may also be displayed on the subsequent screen together with the list of the music files. If the user selects one of the music files on the list, the selected music file is reproduced and a user interface for controlling the reproduction of the music file is displayed on the subsequent screen. Furthermore, a user interface for streaming the music file in real time may also be displayed on the subsequent screen.

If the user selects the second user interface 1432 related to Photo share, a list of photo files previously shared with other devices is displayed on the subsequent screen. A user interface for adding photo files to be shared may also be displayed on the subsequent screen together with the list of the photo files. If the user selects one of the photo files on the list, the selected photo file is magnified and displayed on the subsequent screen.

If the user selects the second user interface 1442 related to Vibe Message, a user interface for transmitting a vibe message to another device is displayed on the subsequent screen. The vibe message may be transmitted by adjusting the intensity and length of vibration according to a rhythm set in advance or arbitrarily set by the user.

Figure 15B:
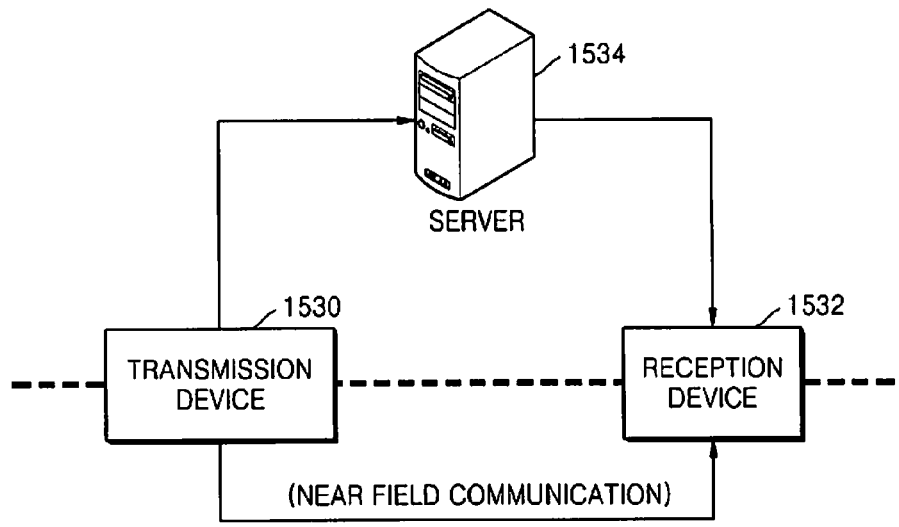
FIG. 15B is a diagram illustrating a method of transceiving a vibe message, according to an embodiment of the present invention.

FIG. 15B is a diagram illustrating a method of transceiving a vibe message, according to an embodiment of the present invention.

Referring to FIG. 15B, if a user of a transmission device 1530 selects the second user interface 1442 for transceiving the vibe message on the screen 1510, the vibe message is transmitted to a reception device 1532 by adjusting the intensity and length of vibration.

If the vibe message is transceived via an Internet protocol (IP) network (for example, the vibe message is transmitted via a Wireless Local Area Network (WLAN)), the transmission device 1530 transmits the vibe message to the push server 1534 via a WLAN module. Information for identifying the reception device 1532 (for example, an IP address or a Personal Identification Number (PIN) of the reception device 1532) may also be transmitted to the push server 1534 together with the vibe message in order to allow the push server 1534 to accurately transmit the vibe message to the transmission device 1530. The push server 1534 may transmit the vibe message received from the transmission device 1530, to the reception device 1532, using a push method. A network between the transmission device 1530 and the push server 1534, and between the push server 1534 and the reception device 1532 is not necessarily an IP network, and may be a cell-based circuit switch network such as a Code Division Multiple Access (CDMA) network, a Global System for Mobile communications (GSM) network, or a Wideband CDMA (WCDMA) network.

If the transmission device 1530 and the reception device 1532 are sufficiently close to each other and thus, the push server 1534 is not required, the vibe message may be directly transmitted by using Near Field Communication (NFC) technology such as Bluetooth®, Zigbee®, or Radio Frequency IDentification (RFID).

Referring back to FIG. 15A, if the user selects the second user interface 1452 related to Date History, a list of times when a device of the user has been located within a certain distance from other devices is displayed. A user interface for sorting the times on the list according to date and a user interface for sorting places where the device has been located within the certain distance from other devices may also be displayed on the subsequent screen.

Figure 15C:
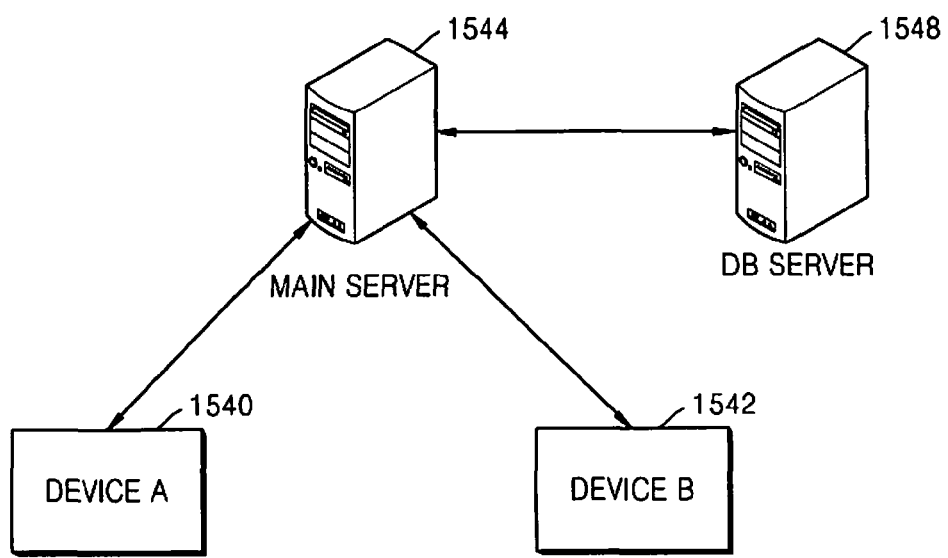
FIG. 15C is a diagram illustrating a method of providing a date history service, according to an embodiment of the present invention.

FIG. 15C is a diagram illustrating a method of providing a date history service, according to an embodiment of the present invention.

Referring to FIG. 15C, a device A 1540 and a device B 1542 periodically transmit their location information to a main server 1544 so as to allow the main server 1544 to continuously trace the locations of device A 1540 and the device B 1542. The device A 1540 and the device B 1542 generate the location information, e.g., by using Global Positioning System (GPS) modules included in the device A 1540 and the device B 1542, and periodically transmit the generated location information to the main server 1544.

The main server 1544 determines the distance between the device A 1540 and the device B 1542 based on the location information received from the device A 1540 and the device B 1542, and stores in a DataBase (DB) server 1548 times and locations when the device A 1540 and the device B 1542 are located within the certain distance.

If the user of the device A 1540 or the device B 1542 selects the second user interface 1452 related to Date History on the user interface illustrated in FIG. 15A, the device A 1540 or the device B 1542 requests information regarding the times and the places when the device A 1540 and the device B 1542 are located within the certain distance from the DB server 1548, and the DB server 1548 transmits the information to the device A 1540 or the device B 1542 in response to the request.

Figure 16:
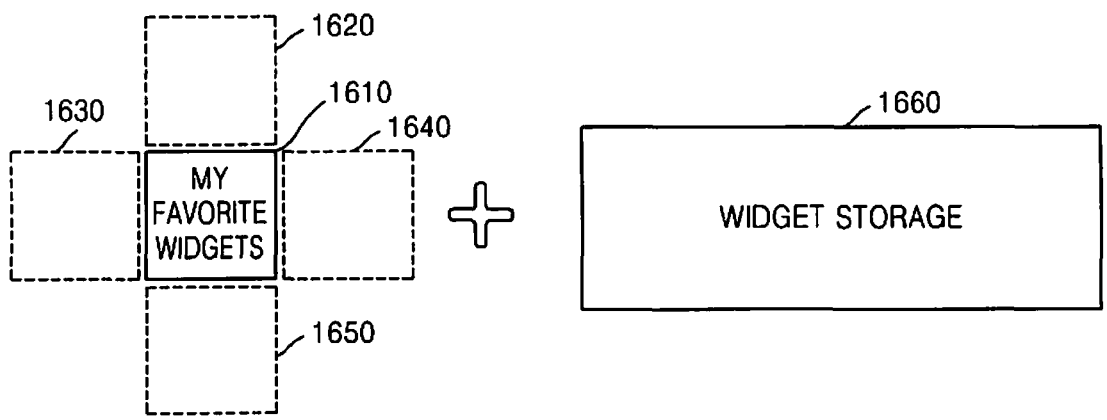
FIG. 16 illustrates a user interface related to a favorite widget setting, according to an embodiment of the present invention.

FIG. 16 illustrates a user interface related to a favorite widget setting, according to an embodiment of the present invention.

Referring to FIG. 16, a first user interface 1610 is related to a favorite widget setting. If the favorite widget setting is a parent element, a plurality of widgets favored by a user may be child elements. Accordingly, the first user interface 1610 is a user interface related to the parent element, i.e., the favorite widget setting, the widgets favored by the user from among a plurality of widgets included in widget storage 1660 may be displayed on neighboring zones 1620, 1630, 1640, and 1650 of the first user interface 1610.

Figure 17:
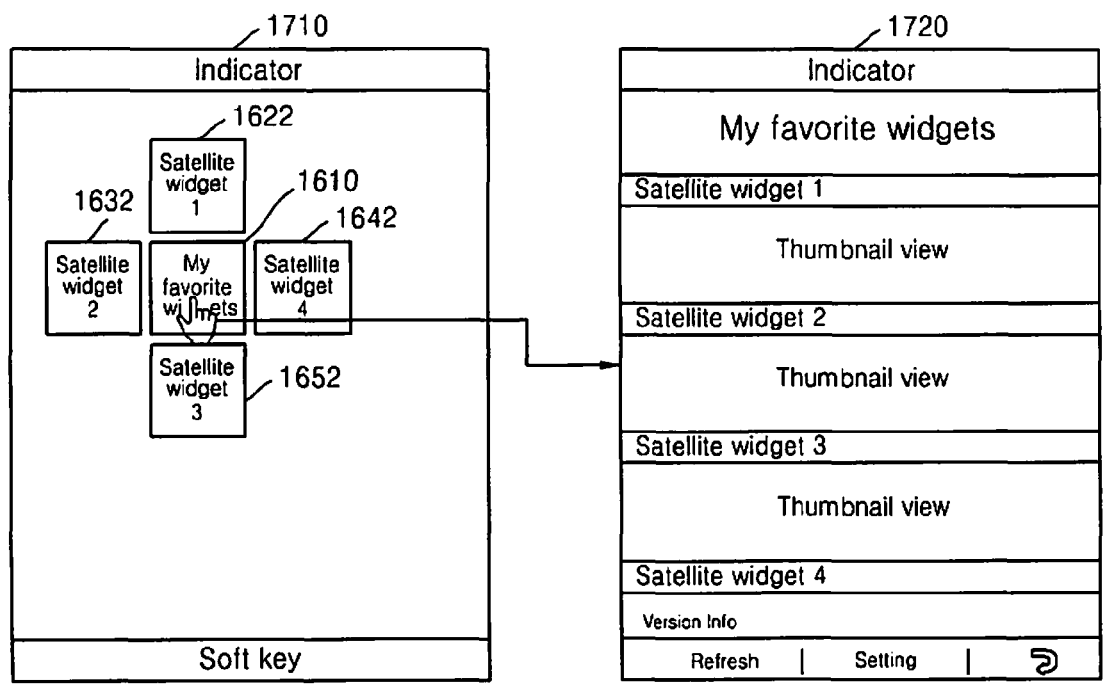
FIG. 17 illustrates screen images when displaying a user interface related to a favorite widget setting, according to an embodiment of the present invention.

FIG. 17 illustrates screen images when displaying a user interface related to a favorite widget setting, according to an embodiment of the present invention.

Referring to FIG. 17, a first user interface 1610 and a plurality of second user interfaces 1622, 1632, 1642, and 1652 are displayed on a screen 1710.

If a user selects the first user interface 1710 on the screen 1610, a user interface for setting favorite widgets is displayed on a screen 1720. A user interface for selecting one or more widgets to be displayed as the second user interfaces 1622, 1632, 1642, and 1652 on neighboring zones of the first user interface 1610 is displayed.

Figure 18:
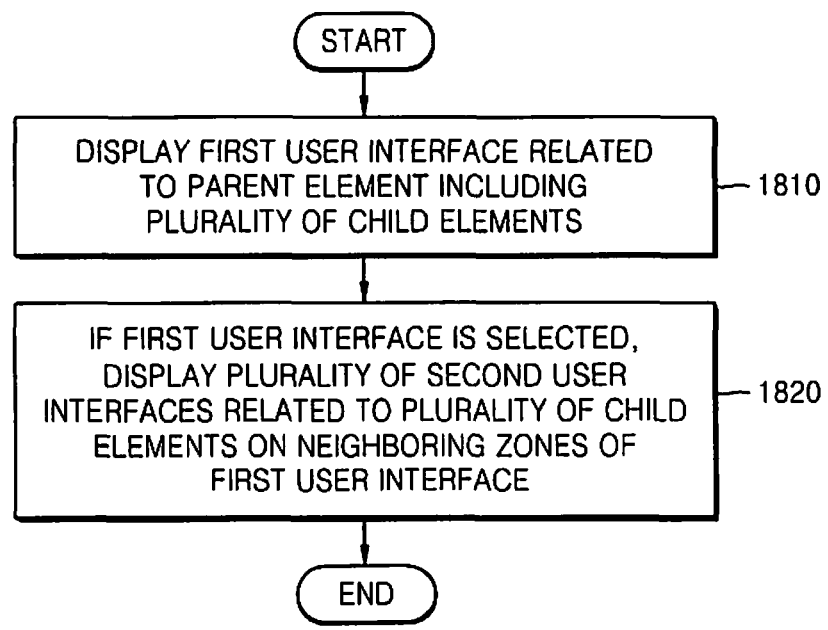
FIG. 18 is a flowchart illustrating a method of providing a user interface, according to an embodiment of the present invention.

FIG. 18 is a flowchart illustrating a method of providing a user interface, according to an embodiment of the present invention.

Referring to FIG. 18, in step 1810, an apparatus for providing a user interface displays a first user interface related to a parent element including a plurality of child elements. A user interface, e.g., related to a keyword, a name of a region, a certain time, association between devices, or a favorite widget setting in which a user interested, is displayed.

If the displayed first user interface is selected in step 1810, in step 1820, the apparatus displays a plurality of second user interfaces related to the child elements on neighboring zones of the first user interface. As illustrated in FIGS. 4A to 4C, the first and second user interfaces can be displayed in a number of configurations.

Figure 19:
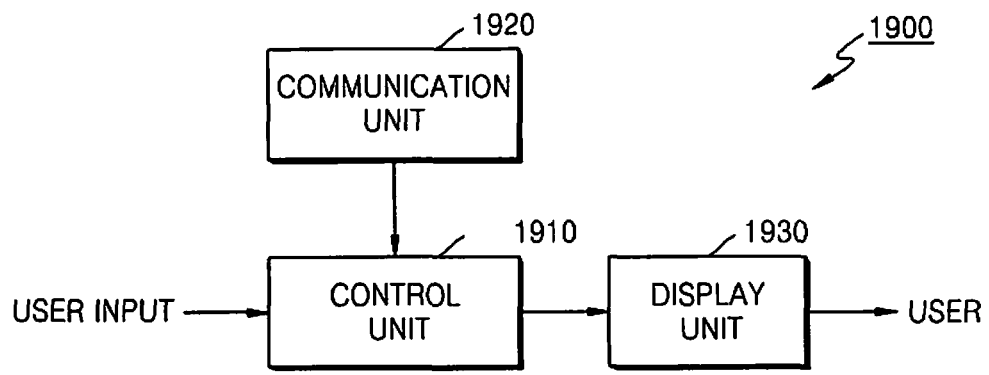
FIG. 19 is a block diagram illustrating an apparatus for providing a user interface, according to an embodiment of the present invention.

FIG. 19 is a block diagram illustrating an apparatus for providing a user interface, according to an embodiment of the present invention.

Referring to FIG. 19, the apparatus 1900 includes a control unit 1910, a communication unit 1920, and a display unit 1930.

The control unit 1910 generates a first user interface related to a parent element and a plurality of second user interfaces related to child elements. If a user interface displayed on a screen includes information received from an external server or device via the communication unit 1920, the first user interface and the second user interfaces are generated by using the received information.

After the first user interface related to the parent element is generated, if a user selects the first user interface, the second user interfaces are generated on neighboring zones of the first user interface.

The communication unit 1920 receives from the external server or device information required to generate the first user interface and the second user interfaces.

The display unit 1930 displays the first user interface and the second user interfaces by the control of the control unit 1910. If the first user interface generated by the control unit 1910 is displayed and selected and thus the control unit 1910 generates the second user interfaces on the neighboring zones of the first user interface, the first user interface and the second user interfaces are displayed.

According to the above-described embodiments of the present invention, a user may intuitively view and select one of a user interface related to a parent element and a plurality of user interfaces related to child elements, which are displayed on a screen, and thus, may easily and rapidly access desired information or a desired service.

Further, if a central widget displayed on a screen is selected, a plurality of peripheral widgets related to the central widget may be provided, and the peripheral widgets may receive from content providers various contents related to the central widget. As such, a user may simultaneously access a plurality of content providers to receive contents related to a certain item.

Certain embodiments of the present invention can also be embodied as computer-readable codes on a computer-readable recording medium. The computer-readable recording medium is any data storage device that can store data, which can be thereafter read by a computer system.

For example, the apparatus 1900 illustrated in FIG. 19 may include a bus connected to every unit of the apparatus 1900, at least one processor connected to the bus, and memory connected to the bus so as to store commands, receive messages, or generate messages and connected to the processor for executing the commands.

Examples of the computer-readable recording medium include Read-Only Memory (ROM), Random-Access Memory (RAM), CD-ROMs, magnetic tapes, floppy disks, and optical data storage devices. The computer-readable recording medium can also be distributed over network-coupled computer systems so that the computer-readable code is stored and executed in a distributed fashion.

While the present invention has been particularly shown and described with reference to certain embodiments thereof, it will be understood by one of ordinary skill in the art that various changes in form and details may be made therein without departing from the spirit and scope of the present invention as defined by the following claims and their equivalents.

What is claimed is:

1. A method for providing a user interface, the method comprising:
   displaying a first user interface and a plurality of second user interfaces;
   receiving a keyword through the first user interface;
   transmitting the keyword to at least one of a plurality of contents providers, wherein each of the plurality of contents providers corresponds to each of the plurality of second user interfaces;
   receiving information related to the keyword from the at least one contents provider; and
   displaying at least one indicator corresponding to the information in the first user interface and the plurality of second user interfaces,
   wherein transmitting the keyword comprises:
   transmitting, when the first user interface is selected, the keyword to the plurality of contents providers; and
   transmitting, when one of the plurality of second user interfaces is selected, the keyword to the contents provider corresponding to the selected second user interface,
   wherein each of the plurality of second user interfaces respectively displays an abstract of the information received from the corresponding at least one contents provider, wherein the abstract indicates a number of contents which are included in the information received from the corresponding at least one contents provider.

2. The method of claim 1, further comprising:
   displaying an abstract of the information through the first user interface, wherein the abstract indicates a total number of contents which are included in the information.

3. The method of claim 1, wherein the information comprises an abstract of searched contents related to the keyword.

4. The method of claim 3, wherein the abstract of the searched contents comprises an abstract of at least one of a content name, a thumbnail image, and a name of a contents provider.

5. The method of claim 1, wherein the information is displayed considering a usage frequency of the at least one contents provider.

6. The method of claim 1, wherein displaying the first user interface and the plurality of second user interfaces comprises:
   displaying the first user interface; and
   displaying, when the displayed first user interface is selected, the plurality of second user interfaces on neighboring regions of the first user interface.

7. The method of claim 1, wherein an image related to the keyword is displayed through the first user interface.

8. An apparatus for providing a user interface, the apparatus comprising:
- a display unit for displaying a first user interface and a plurality of second user interfaces;
- a control unit for receiving a keyword through the first user interface; and
- a communication unit for transmitting the keyword to at least one of a plurality of contents providers, wherein each of the plurality of contents providers corresponds to each of the plurality of second user interfaces, and receiving information related to the keyword from the at least one contents provider,
- wherein the display unit further displays at least one indicator corresponding to the information in the first user interface and the plurality of second user interfaces,
- wherein the communication unit transmits the keyword to the plurality of contents providers when the first user interface is selected, and transmits the keyword to one of the plurality of contents providers when the second user interface corresponding to the contents provider is selected, and
- wherein each of the plurality of second user interfaces respectively displays an abstract of the information received from the corresponding at least one contents provider, wherein the abstract indicates a number of contents which are included in the information received from the corresponding at least one contents provider.

9. The apparatus of claim 8, wherein the display unit further displays an abstract of the information through the first user interface, and wherein the abstract indicates a total number of contents which are included in the information.

10. The apparatus of claim 8, wherein the information comprises an abstract of searched contents related to the keyword.

11. The apparatus of claim 10, wherein the abstract of the searched contents comprises at least one of a content name, a thumbnail image, and a name of a contents provider.

12. The apparatus of claim 8, wherein the display unit displays the information considering a usage frequency of the at least one contents provider.

13. The apparatus of claim 8, wherein the display unit displays the plurality of second user interfaces when the displayed first user interface is selected.

14. The apparatus of claim 8, wherein the display unit displays an image related to the keyword through the first user interface.

15. The method of claim 1,
- wherein displaying at least one indicator corresponding to the information comprises:
- displaying, when the first user interface is selected, a first indicator corresponding to the information in the first user interface; and
- displaying, when one of the plurality of second user interfaces is selected, a second indicator corresponding to the information in the selected second user interface.

16. The apparatus of claim 8, wherein the display unit displays, when the first user interface is selected, a first indicator corresponding to the information in the first user interface; and
displays, when one of the plurality of second user interfaces is selected, a second indicator corresponding to the information in the selected second user interface.

* * * * *